(12) United States Patent
Wright et al.

(10) Patent No.: US 8,169,421 B2
(45) Date of Patent: May 1, 2012

(54) APPARATUS AND METHOD FOR DETECTING A TOUCH-SENSOR PAD GESTURE

(75) Inventors: David G. Wright, San Diego, CA (US); Edward L. Grivna, Brooklyn Park, MN (US); Ronald H. Sartore, Poway, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 828 days.

(21) Appl. No.: 11/471,100

(22) Filed: Jun. 19, 2006

(65) Prior Publication Data

US 2007/0291009 A1 Dec. 20, 2007

(51) Int. Cl.
*G06F 3/033* (2006.01)

(52) U.S. Cl. ............ 345/179; 345/173; 178/18.03; 178/19.01; 715/863

(58) Field of Classification Search .......... 345/173
See application file for complete search history.

(56) References Cited

U.S. PATENT DOCUMENTS

| | | | | |
|---|---|---|---|---|
| 5,231,380 A * | 7/1993 | Logan | | 345/156 |
| 5,305,017 A | 4/1994 | Gerpheide | | |
| 5,347,295 A * | 9/1994 | Agulnick et al. | | 345/156 |
| 5,488,204 A * | 1/1996 | Mead et al. | | 178/18.06 |
| 5,543,591 A * | 8/1996 | Gillespie et al. | | 178/18.03 |
| 5,748,185 A | 5/1998 | Stephan et al. | | |
| 5,757,363 A * | 5/1998 | Oishi et al. | | 345/173 |
| 5,764,218 A * | 6/1998 | Della Bona et al. | | 345/157 |
| 5,943,052 A | 8/1999 | Allen et al. | | |
| 5,982,302 A * | 11/1999 | Ure | | 341/22 |
| 5,995,084 A * | 11/1999 | Chan et al. | | 345/173 |
| 6,005,549 A * | 12/1999 | Forest | | 345/157 |
| 6,028,271 A | 2/2000 | Gillespie et al. | | |
| 6,057,830 A * | 5/2000 | Chan et al. | | 345/157 |
| 6,061,051 A * | 5/2000 | Chan et al. | | 345/173 |
| 6,188,391 B1 | 2/2001 | Seely et al. | | |
| 6,380,931 B1 | 4/2002 | Gillespie et al. | | |
| 6,414,671 B1 | 7/2002 | Gillespie et al. | | |
| 6,590,567 B1 * | 7/2003 | Nagao et al. | | 345/173 |
| 6,704,005 B2 | 3/2004 | Kato et al. | | |
| 6,825,890 B2 | 11/2004 | Matsufusa | | |
| 7,030,860 B1 | 4/2006 | Hsu et al. | | |
| 7,084,860 B1 * | 8/2006 | Jaeger et al. | | 345/173 |
| 7,190,348 B2 * | 3/2007 | Kennedy et al. | | 345/168 |
| 7,307,485 B1 * | 12/2007 | Snyder et al. | | 331/150 |
| 7,665,042 B2 * | 2/2010 | Katayama | | 715/863 |
| 2002/0057263 A1 * | 5/2002 | Keely et al. | | 345/179 |
| 2003/0043174 A1 * | 3/2003 | Hinckley et al. | | 345/684 |

(Continued)

OTHER PUBLICATIONS

A switched-capacitor interface for capacitive sensors based on relaxation oscillators, Cichocki, A.; Unbehauen, R.; Instrumentation and Measurement, IEEE Transactions on, vol. 39, Issue 5, Oct. 1990 pp. 797-799.*

(Continued)

*Primary Examiner* — Nitin Patel
*Assistant Examiner* — Dorothy Harris

(57) ABSTRACT

An apparatus and method for distinguishing a particular gesture from among multiple gestures, performed by a conductive object on the sensing device, using fewer than three time intervals. The apparatus may include a sensing device to detect a presence of a conductive object, and a processing device, coupled to the sensing device, to distinguish the multiple gestures. The method may include distinguishing between a tap gesture, a double tap gesture, a drag gesture, and a motion gesture.

38 Claims, 14 Drawing Sheets

U.S. PATENT DOCUMENTS

| | | | |
|---|---|---|---|
| 2005/0179646 A1* | 8/2005 | Lin et al. | 345/156 |
| 2006/0007166 A1* | 1/2006 | Lin et al. | 345/173 |
| 2006/0066582 A1 | 3/2006 | Lyon et al. | |
| 2006/0097991 A1 | 5/2006 | Hotelling et al. | |
| 2007/0229466 A1* | 10/2007 | Peng et al. | 345/173 |

OTHER PUBLICATIONS

A voltage-controlled switched-capacitor relaxation oscillator, Martin, K.; Solid-State Circuits, IEEE Journal of, vol. 16, Issue 4, Aug. 1981 pp. 412-414.*

Ryan Seguine, et al., "Layout Guidelines for PSoC™ CapSense™", Cypress Application Note AN2292, Revision B, Oct. 31, 2005, pp. 1-15.

Dennis Seguine, "Capacitive Switch Scan", Cypress Application Note AN2233a, Revision B, Apr. 14, 2005, pp. 1-6.

Chapweske, Adam, "The PS/2 Mouse Interface", PS/2 Mouse Interfacing, 2001, 10 pages.

"Touchscreen", Wikipedia, the free encyclopedia, Dowloaded: Jun. 15, 2006, 3 pages, http://en.wikipedia.org/wiki/Touch_screen.

* cited by examiner

APPARATUS AND METHOD FOR DETECTING A TOUCH-SENSOR PAD GESTURE

TECHNICAL FIELD

This invention relates to the field of user interface devices and, in particular, to touch-sensor devices.

BACKGROUND

Computing devices, such as notebook computers, personal data assistants (PDAs), and mobile handsets, have user interface devices, which are also known as human interface device (HID). One user interface device that has become more common is a touch-sensor pad. A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a cursor, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch panels, or touchscreen panels are display overlays which are typically either pressure-sensitive (resistive), electrically-sensitive (capacitive), acoustically-sensitive (SAW—surface acoustic wave) or photo-sensitive (infrared). The effect of such overlays allows a display to be used as an input device, removing the keyboard and/or the mouse as the primary input device for interacting with the display's content. Such displays can be attached to computers or, as terminals, to networks. There are a number of types of touch screen technology, such as optical imaging, resistive, surface wave, capacitive, infrared, dispersive signal, and strain gauge technologies. Touch screens have become familiar in retail settings, on point of sale systems, on ATMs, on mobile handsets, on game consoles, and on PDAs where a stylus is sometimes used to manipulate the graphical user interface (GUI) and to enter data.

FIG. 1A illustrates a conventional touch-sensor pad. The touch-sensor pad 100 includes a sensing surface 101 on which a conductive object may be used to position a cursor in the x- and y-axes, or to select an item on a display. Touch-sensor pad 100 may also include two buttons, left and right buttons 102 and 103, respectively. These buttons are typically mechanical buttons, and operate much like a left and right button on a mouse. These buttons permit a user to select items on a display or send other commands to the computing device.

FIG. 1B illustrates a conventional linear touch-sensor slider. The linear touch-sensor slider 110 includes a surface area on which a conductive object may be used to position a cursor in the x axis (or alternatively in the y-axis). The construct of touch-sensor slider 110 may be the same as that of touch-sensor pad 100. Touch-sensor slider 110 may include a one-dimensional sensor array. The slider structure may include one or more sensor elements that may be conductive traces. Each trace may be connected between a conductive line and a ground. By being in contact or in proximity on a particular portion of the slider structure, the capacitance between the conductive lines and ground varies and can be detected. The capacitance variation may be sent as a signal on the conductive line to a processing device. For example, by detecting the capacitance variation of each sensor element, the position of the changing capacitance can be pinpointed. In other words, it can be determined which sensor element has detected the presence of the conductive object, and it can also be determined the motion and/or the position of the conductive object over multiple sensor elements.

One difference between touch-sensor sliders and touch-sensor pads may be how the signals are processed after detecting the conductive objects. Another difference is that the touch-sensor slider is not necessarily used to convey absolute positional information of a conducting object (e.g., to emulate a mouse in controlling cursor positioning on a display) but, rather, may be used to actuate one or more functions associated with the sensing elements of the sensing device.

In addition to detecting motion of the conductive object in one or two axes to control cursor movement, these conventional touch-sensor pads have been designed to recognize gesture features. One conventional touch-sensor pad includes methods for recognizing gestures made by a conductive object on a touch-sensor pad, as taught by U.S. Pat. No. 6,380,931 to Gillespie et al. This conventional touch-sensor pad recognizes tapping, pushing, hopping, and zigzag gestures by analyzing the position, pressure, and movement of the conductive object on the sensor pad during the time of a suspected gesture, and sends signals to a host indicating the occurrence of these gestures.

This conventional touch-sensor pad includes a capacitive position sensing system, which determines the position of the conductive object, such as a finger, that is proximate to or touching a sensing surface. This conventional touch-sensor pad also obtains the finger pressure by summing the capacitances measured on sense lines. A finger is present if the pressure exceeds a suitable threshold value. The basic "tap" gesture is a quick tap of the finger on the pad. Such a tap, of short duration, involving little or no X or Y finger motion during the tap, is presented to the host as a brief click of the mouse button. If a multi-button mouse is simulated, the tap gesture may simulate a click of the "primary" mouse button, or the button to be simulated may be user-selectable using a shift key, control panel, or other known means. Two taps in rapid succession are presented to the host as a double click of the button. In general, multiple taps translate into multiple clicks.

In addition, because it is impossible to tell whether a finger stroke will be a valid tap while the finger is still down (as opposed to a cursor motion), this conventional touch-sensor pad, does not report a button click until the finger is lifted. This delay is not generally noticeable to the user since taps by definition are very brief strokes.

As described above, conventional touch-sensor pads use qualifiers, such as time, pressure, and motion, to determine gestures on the touch-sensor pad. For example, the conventional touch-sensor pad of U.S. Pat. No. 6,380,931 uses time, pressure, and motion to determine a tap gesture. If a finger stroke is less than a specified amount of time (e.g., TapTime), does not move outside a specified radius (e.g., TapRadius), and is applied such that the measured pressures is above a specified threshold (e.g., Ztap threshold) for at least some part of the stroke, a tap gesture is recognized. The conventional touch-sensor pad discerns the difference between normal track-sensor pad motion and a tap gesture using timing. A tap gesture is recognized when the time the conductive object is present on the touch-sensor pad is less than a reference amount of time; and conversely, a motion gesture is recognized (e.g., no tap gesture is recognized) when the time the conductive object is present on the touch-sensor pad is more than the reference amount of time.

FIG. 1C illustrates the timing of a tap gesture, as recognized by a conventional touch-sensor pad. As the conductive object is detected, the finger pressure 111 (e.g., Ztap) increases. The conductive object is present for time 113, which is less than the reference amount of time. Accordingly, the output signal 112, which represents the virtual button press signal, asserts a tap gesture 116 for a specified amount of time, time 114. FIG. 1C also illustrates the timing of a motion gesture. As the conductive object is detected, the finger pressure 111 increases. The conductive object is present for time 115, which is more than the reference amount of time. Accordingly, the output signal 112 does not send a tap gesture. Since no tap gesture is detected, and assuming that no other gesture is recognized, the touch-sensor pad recognizes the presence as a motion gesture.

FIG. 1D illustrates the timing of a drag gesture, as recognized by the conventional touch-sensor pad. To perform a drag gesture, the user taps once, quickly brining the finger back in contact with the touch-sensor pad, then moves the finger in a desired direction in the x/y plane of the pad. The drag gesture begins with a tap gesture, of which the finger pressure 111 is detected for an amount of time, time 124, which is less than a specified amount of time (e.g., TapTime). The output signal 112 goes high in response to this tap gesture. The finger is removed, and remains away from the touch-sensor pad for an amount of time, time 125, which is less than a second specified amount of time (e.g., DragTime). Then the finger returns to the touch-sensor pad and remains present for an amount of time, time 126, which is greater than a specified amount of time (e.g., TapTime). The output signal 112 remains high until the finger is removed from the touch-sensor pad at time 127.

FIG. 1E illustrates the timing of a double tap gesture, as recognized by the conventional touch-sensor pad. The double tap gesture starts out the same as the drag gestures of FIG. 1D with the time 118 that finger pressure 111 is present, being less than a specified amount of time (e.g., TapTime). The finger is removed for time 119, which is less than the than a second specified amount of time (e.g., DragTime), and then the finger returns to the touch-sensor pad and remains present for an amount of time, time 120, which is less than a specified amount of time (e.g., TapTime). Accordingly, the output signal 112 outputs a double tap gesture 123, which includes an extended time interval 122. The double tap gesture 123 may include a brief time period 121 after recognition of the tap, to allow two distinct clicks, rather than one long, run-together click to be seen by the host.

As mentioned above, the timing of the finger presence/absence is one of several factors which are used to discern the difference between normal motion gestures and the other gestures, such as tap, double tap, or drag gestures. As illustrated above with respect to FIGS. 1C-1E three or more time intervals are used to distinguish one type of gesture from another, and typical implementations use three or more separate times to measure these intervals. The states of the conventional touch-sensor pad change upon detection of presence or absence of the finger. For example, first time interval is started when the finger pressure 111 is above a certain threshold (e.g., Ztap), the second time interval starts when the finger is removed from the touch-sensor pad, and the third time interval starts when the finger returns to the touch-sensor pad (if at all). All of the time intervals start and stop upon detection of the presence or absence of the finger.

The use of three or more time periods in gesture recognition requires more timers in a circuit, such as a microcontroller unit, that implements the touch-sensor pad. In addition, the user is able to configure the touch-sensor pad to suit the user's preferences. Having three or more variables to adjust in tuning the function of the touch-sensor pad may be confusing, rendering the configuration feature less useful.

BRIEF DESCRIPTION OF THE DRAWINGS

The present invention is illustrated by way of example, and not by way of limitation, in the figures of the accompanying drawings.

DETAILED DESCRIPTION

Figure 1A:
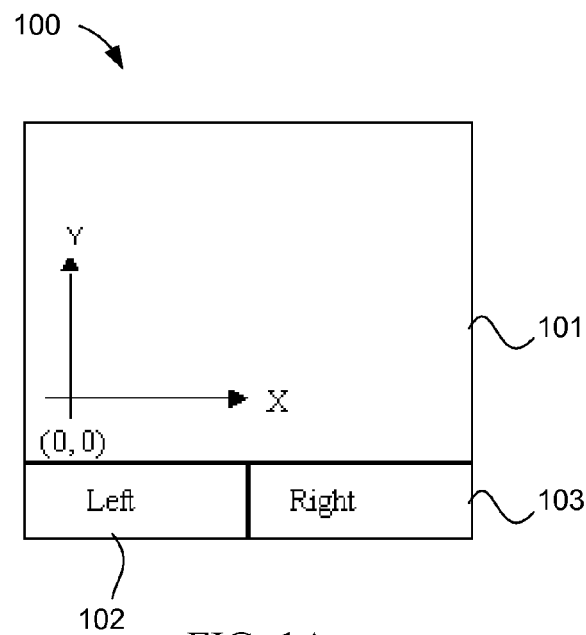
FIG. 1A illustrates a conventional touch-sensor pad.
Figure 1B:
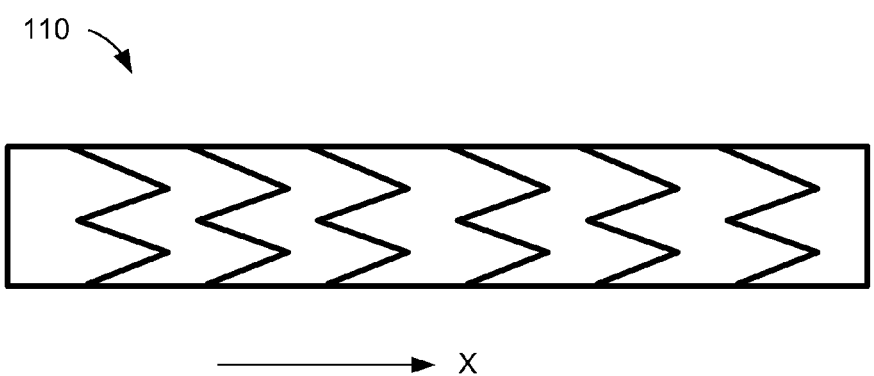
FIG. 1B illustrates a conventional linear touch-sensor slider.
Figure 1C:
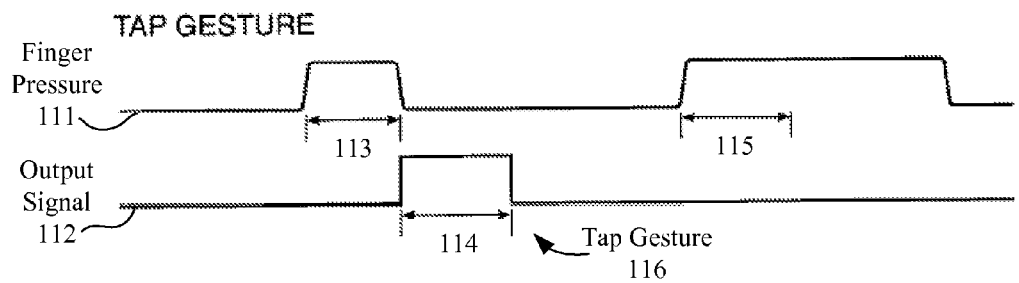
FIG. 1C illustrates the timing of a tap gesture, as recognized by a conventional touch-sensor pad.
Figure 1D:
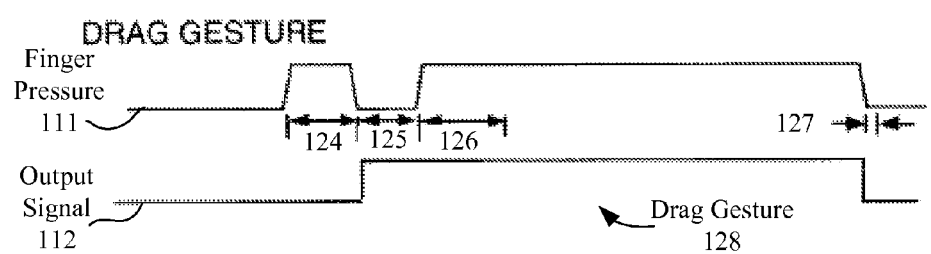
FIG. 1D illustrates the timing of a drag gesture, as recognized by the conventional touch-sensor pad.
Figure 1E:
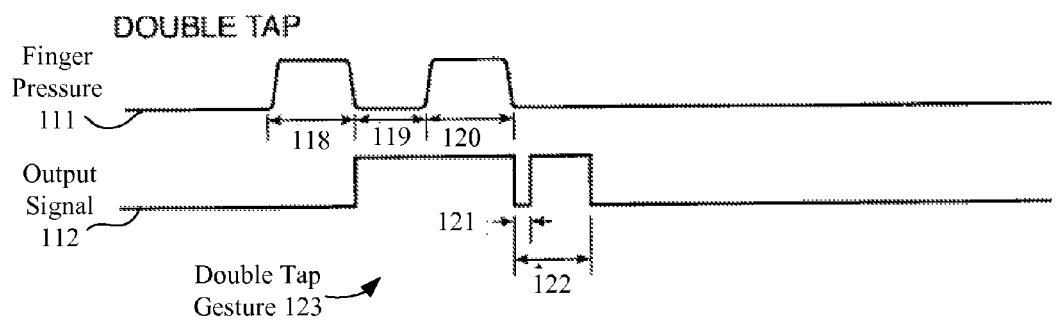
FIG. 1E illustrates the timing of a double tap gesture, as recognized by the conventional touch-sensor pad.

Described herein is a method and apparatus for distinguishing a particular gesture from among multiple gestures, performed by a conductive object on the sensing device, using fewer than three time intervals. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to distinguish a particular gesture from among multiple gestures, performed by a conductive object on the sensing device, using fewer than three time intervals. In one embodiment, the method may include distinguishing between a tap gesture, a double tap gesture, a drag gesture, and a motion gesture. Alternatively, other gestures may be distinguished. In one embodiment, the apparatus may include a sensing device to detect a presence of a conductive object, and a processing device, coupled to the sensing device, to distinguish a particular gesture from among multiple gestures, using fewer than three time intervals.

The embodiments herein describe an improved method of distinguishing touch-sensor pad gestures that uses only two time intervals. This may be done using a single timer, or alternatively, two timers. When a finger (or other conductive object) first touches the touchpad (t0), a timer is started. If the finger remains on the touchpad after a first timeout period (t1), then no gesture is detected, and the touch-sensor pad or touch-sensor pad system begins using the movement of the finger across the touch-sensor pad to provide as input positioning data, such as to control a cursor on a display. When motion is detected and no other gesture is detected, it can be said that the touch-sensor pad detects a motion gesture. If the finger moves away from the touchpad before the first timeout, and does not touch the touch-sensor pad by the end of a second timeout period (t2) then a single "tap" gesture is detected. Conventionally, a single tap gesture is used to mimic the behavior of a left mouse click. If the finger moves away from the touchpad before the first timeout, then touches the touch-sensor pad again, and then moves away from the touchpad by the end of a second timeout period (t2) then a "double tap" gesture is detected. Conventionally, a double tap gesture is used to mimic the behavior of a double left mouse click. If the finger moves away from the touchpad before the first timeout, and then touches the touch-sensor pad again and then remains on the touchpad at the end of a second timeout period (t2) then a "drag" gesture (also referred to as a "tap and drag" gesture) is detected. Conventionally, a drag gesture is used to mimic the behavior of a holding down the left button of a mouse, while moving the mouse.

As described above, in the conventional touch-sensor pad, the timing of finger touches of the touch-sensor pad is one of several criteria used to distinguish between various gestures and normal x/y touchpad movement. Similarly, the embodiments described herein may be used as one of several criteria for detecting gestures, or as the sole criterion for detecting a gestures (and distinguishing between different gestures).

Figure 2:
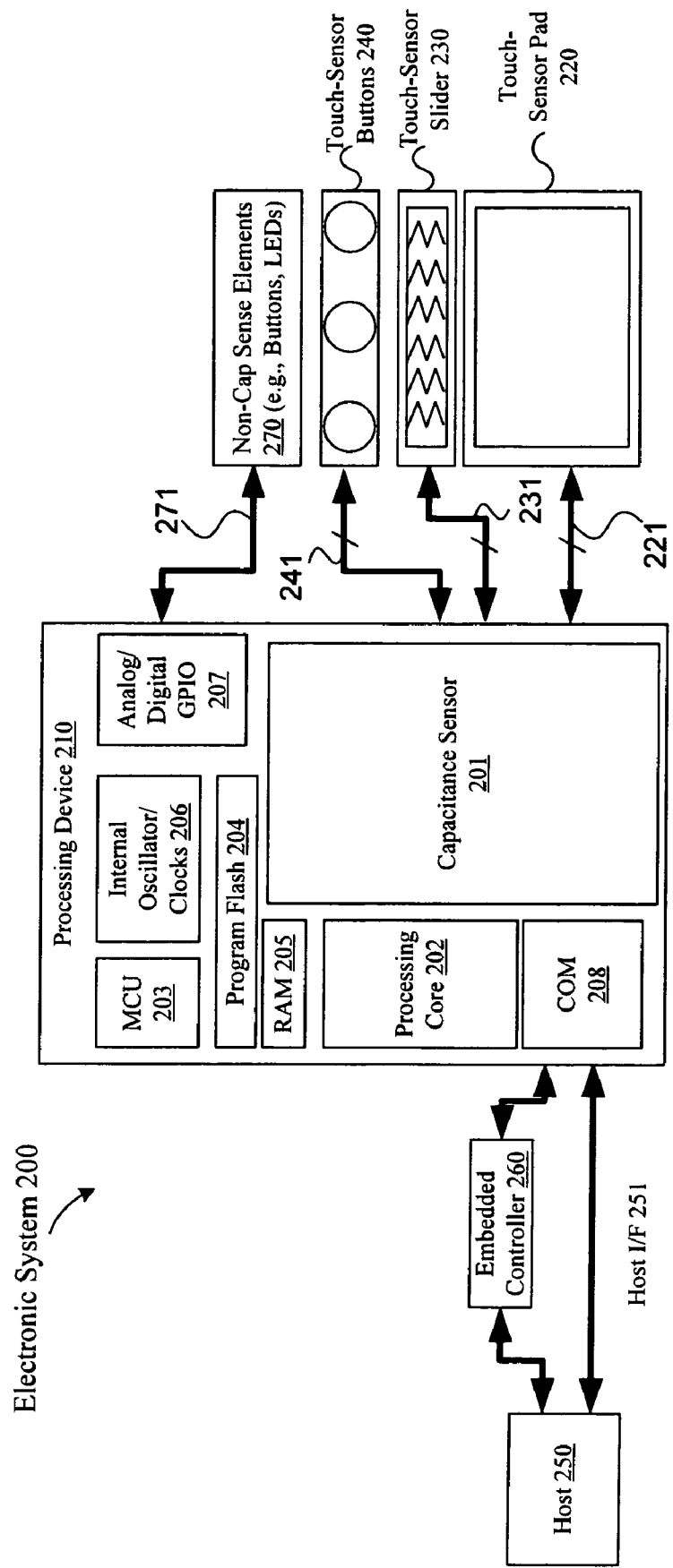
FIG. 2 illustrates a block diagram of one embodiment of an electronic system having a processing device for detecting a presence of a conductive object.

FIG. 2 illustrates a block diagram of one embodiment of an electronic system having a processing device for detecting a presence of a conductive object. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 210 may also include memory, such as random access memory (RAM) 205 and program flash 204. RAM 205 may be static RAM (SRAM), and program flash 204 may be a non-volatile storage, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters, etc.) using, in one embodiment, configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 202 are described in more detail below.

It should be noted that the embodiments described herein are not limited to touch-sensor pads for notebook implementations, but can be used in other capacitive sensing implementations, for example, the sensing device may be a touch screen, a touch-sensor slider 230, or a touch-sensor button 240 (e.g., capacitance sensing button). It should also be noted that the embodiments described herein may be implemented in other sensing technologies than capacitive sensing, such as resistive, optical imaging, surface wave, infrared, dispersive signal, and strain gauge technologies. Similarly, the operations described herein are not limited to notebook cursor operations, but can include other operations, such as lighting control (dimmer), volume control, graphic equalizer control, speed control, or other control operations requiring gradual adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 200 includes a touch-sensor pad 220 coupled to the processing device 210 via bus 221. Touch-sensor pad 220 may include a multi-dimension sensor array. The multi-dimension sensor array includes multiple sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array includes multiple sensor elements, organized as rows, or alternatively, as columns. In another embodiment, the electronic system 200 includes a touch-sensor button 240 coupled to the processing device 210 via bus 241. Touch-sensor button 240 may include a single-dimension or multi-dimension sensor array. The single- or multi-dimension sensor array includes multiple sensor elements. For a touch-sensor button, the sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitance sensor element. Capacitance sensor elements may be used as non-contact switches. These switches, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may be used in a touch screen display. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, or other functional keys that do not require capacitance sensing. In one embodiment, buses 271, 241, 231, and 221 may be a single bus. Alternatively, these buses may be configured into any combination of one or more separate buses.

The processing device may also provide value-added functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) line 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interfaces (SPI). The host 250 and/or embedded controller 260 may be coupled to the processing device 210 with a ribbon or flex cable from an assembly, which houses the sensing device and processing device.

In one embodiment, the processing device 210 is configured to communicate with the embedded controller 260 or the host 250 to send and/or receive data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In other words, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the cursor, scroll-up, scroll-down, scroll-left, scroll-right, step Back, and step Forward. Alternatively, other user interface device commands may be communicated to the host 250 from the processing device 210. These commands may be based on gestures occurring on the sensing device that are recognized by the processing device, such as tap, push, hop, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the cursor, in the x- or y-axes. Scroll-up, scroll-down, scroll-left, and scroll-right, step back, and step-forward may be detected when the absolute position of the conductive object is within a pre-defined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 210 may also be done in the host.

In one embodiment, the method and apparatus described herein may be implemented in a fully self-contained touch-sensor pad, which outputs fully processed x/y movement and gesture data signals or data commands to a host. In another embodiment, the method and apparatus may be implemented in be a touch-sensor pad, which outputs x/y movement data and also finger presence data to a host, and where the host processes the received data to detect gestures. In another embodiment, the method and apparatus may be implemented in a touch-sensor pad, which outputs raw capacitance data to a host, where the host processes the capacitance data to compensate for quiescent and stray capacitance, and calculates x/y movement and detects gestures by processing the capacitance data. Alternatively, the method and apparatus may be implemented in a touch-sensor pad, which outputs pre-processed capacitance data to a host, where the touchpad processes the capacitance data to compensate for quiescent and stray capacitance, and the host calculates x/y movement and detects gestures from the pre-processed capacitance data.

In one embodiment, the electronic system that includes the embodiments described herein may be implemented in a conventional laptop touch-sensor pad. Alternatively, it may be implemented in a wired or wireless keyboard integrating a touch-sensor pad, which is itself connected to a host. In such an implementation, the processing described above as being performed by the "host" may be performed in part or in whole by the keyboard controller, which may then pass fully processed, pre-processed or unprocessed data to the system host. In another embodiment, the embodiments may be implemented in a mobile handset (e.g., cell phone) or other electronic devices where the touch-sensor pad may operate in one of two or more modes. For example, the touch-sensor pad may operate either as a touch-sensor pad for x/y positioning and gesture recognition, or as a keypad or other array of touch-sensor buttons and/or sliders.

Capacitance sensor 201 may be integrated into the IC of the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). (Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above.

In one embodiment, electronic system 200 may be used in a notebook computer. Alternatively, the electronic device may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 201 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches (e.g., touch-sensor slider), and touch-sensor pads implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches or X-Y touch-sensor pads, a calculation for finding position of the conductive object to greater resolution than the physical pitch of the switches may be used.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
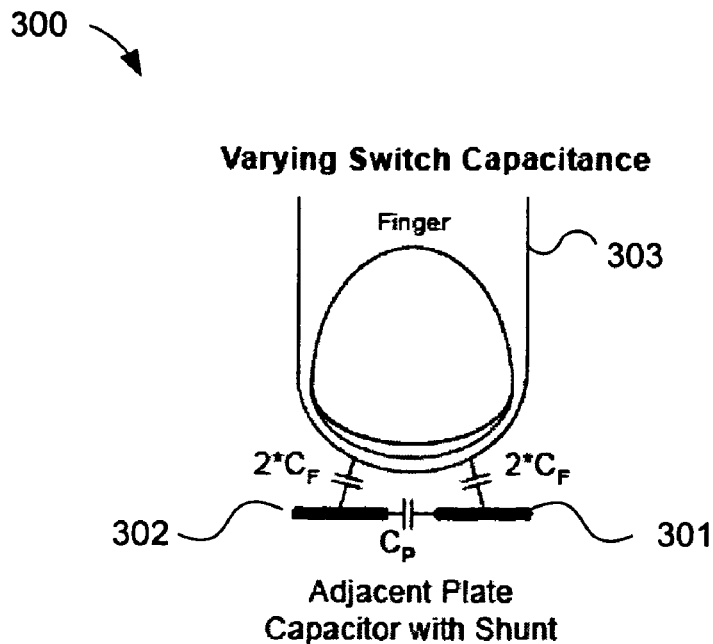
FIG. 3A illustrates a varying switch capacitance.

FIG. 3A illustrates a varying switch capacitance. In its basic form, a capacitive switch 300 is a pair of adjacent plates 301 and 302. There is a small edge-to-edge capacitance Cp, but the intent of switch layout is to minimize the base capacitance Cp between these plates. When a conductive object 303 (e.g., finger) is placed in proximity to the two plate 301 and 302, there is a capacitance 2*Cf between one electrode 301 and the conductive object 303 and a similar capacitance 2*Cf between the conductive object 303 and the other electrode 302. The capacitance between one electrode 301 and the conductive object 303 and back to the other electrode 302 adds in parallel to the base capacitance Cp between the plates 301 and 302, resulting in a change of capacitance Cf. Capacitive switch 300 may be used in a capacitance switch array. The capacitance switch array is a set of capacitors where one side of each is grounded. Thus, the active capacitor (as represented in FIG. 3C as capacitor 351) has only one accessible side. The presence of the conductive object 303 increases the capacitance (Cp+Cf) of the switch 300 to ground. Determining switch activation is then a matter of measuring change in the capacitance (Cf) or capacitance variation. Switch 300 is also known as a grounded variable capacitor. In one exemplary embodiment, Cf may range from approximately 10-30 picofarads (pF). Alternatively, other ranges may be used.

The conductive object in this case is a finger, alternatively, this technique may be applied to any conductive object, for example, a conductive door switch, position sensor, or conductive pen in a stylus tracking system (e.g., stylus).

Figure 3B:
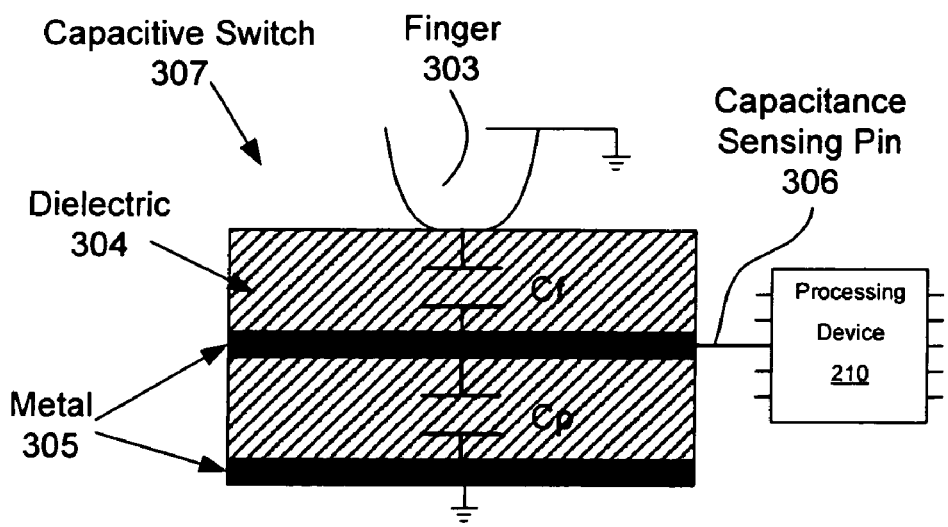
FIG. 3B illustrates one embodiment of a sensing device coupled to a processing device.
Figure 3C:
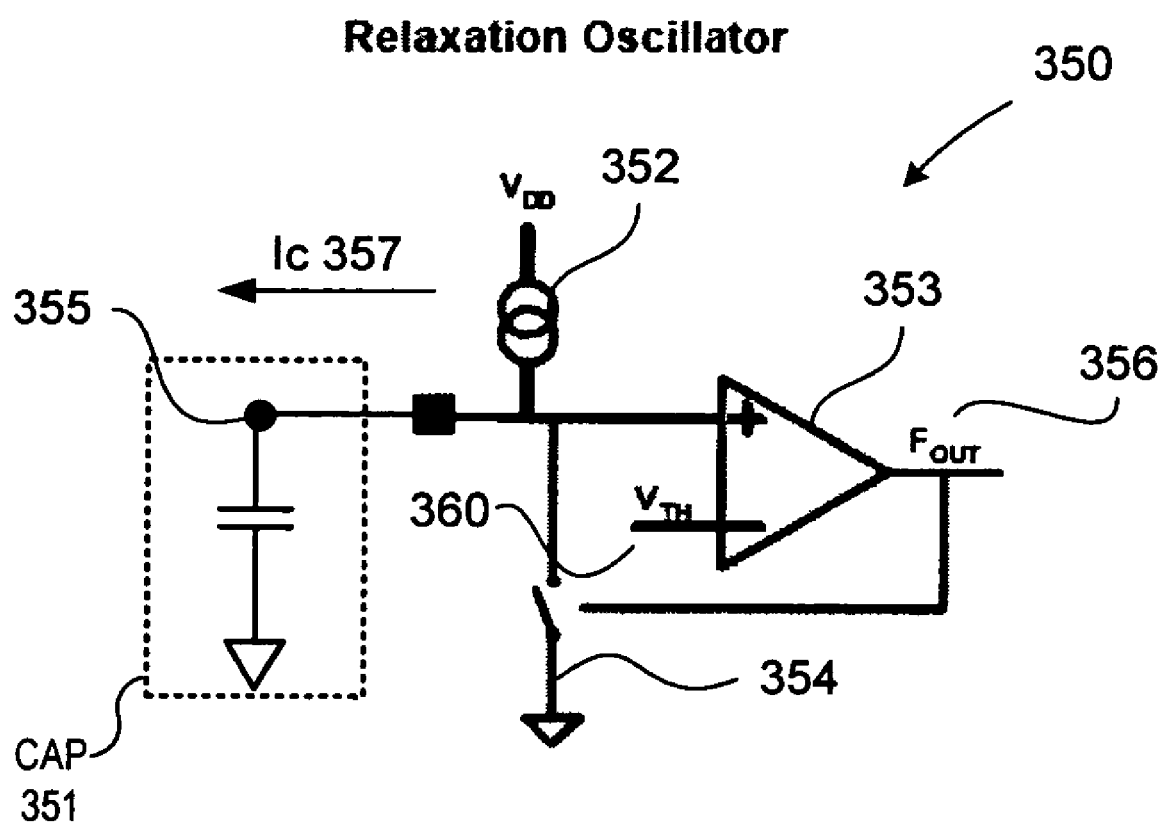
FIG. 3C illustrates one embodiment of a relaxation oscillator.

FIG. 3B illustrates one embodiment of a capacitive switch 307 coupled to a processing device 210. Capacitive switch 307 illustrates the capacitance as seen by the processing device 210 on the capacitance sensing pin 306. As described above, when a conductive object 303 (e.g., finger) is placed in proximity to one of the metal plates 305, there is a capacitance, Cf, between the metal plate and the conductive object 303 with respect to ground. Also, there is a capacitance, Cp, between the two metal plates. Accordingly, the processing device 210 can measure the change in capacitance, capacitance variation Cf, as the conductive object is in proximity to the metal plate 305. Above and below the metal plate that is closest to the conductive object 303 is dielectric material 304. The dielectric material 304 above the metal plate 305 can be the overlay, as described in more detail below. The overlay may be non-conductive material used to protect the circuitry to environmental elements and to insulate the user's finger (e.g., conductive object) from the circuitry. Capacitance switch 307 may be a sensor element of a touch-sensor pad, a touch-sensor slider, or a touch-sensor button.

FIG. 3C illustrates one embodiment of a relaxation oscillator. The relaxation oscillator 350 is formed by the capacitance to be measured on capacitor 351, a charging current source 352, a comparator 353, and a reset switch 354. It should be noted that capacitor 351 is representative of the capacitance measured on a sensor element of a sensor array. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (1) describes the relation between current, capacitance, voltage and time for a charging capacitor.

$$CdV = I_C dt \quad (1)$$

The relaxation oscillator begins by charging the capacitor 351 from a ground potential or zero voltage and continues to pile charge on the capacitor 351 at a fixed charging current Ic 357 until the voltage across the capacitor 351 at node 355 reaches a reference voltage or threshold voltage, $V_{TH}$ 360. At threshold voltage $V_{TH}$ 360, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This resets the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the comparator reset time is long enough to completely reset the charging voltage on capacitor 351. This sets a practical upper limit to the operating frequency. For example, if capacitance C of the capacitor 351 changes, then $f_{RO}$ will change proportionally according to Equation (1). By comparing $f_{RO}$ of $F_{OUT}$ 356 against the frequency ($f_{REF}$) of a known reference system clock signal (REF CLK), the change in capacitance ΔC can be measured. Accordingly, equations (2) and (3) below describe that a change in frequency between $F_{OUT}$ 356 and REF CLK is proportional to a change in capacitance of the capacitor 351.

$$\Delta C \propto \Delta f, \text{ where} \quad (2)$$

$$\Delta f = f_{RO} - f_{REF}. \quad (3)$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a signal indicative of the difference Δf between these frequencies. By monitoring Δf one can determine whether the capacitance of the capacitor 351 has changed.

In one exemplary embodiment, the relaxation oscillator 350 may be built using a programmable timer (e.g., 555 timer) to implement the comparator 353 and reset switch 354. Alternatively, the relaxation oscillator 350 may be built using other circuitry. Relaxation oscillators are known in by those of ordinary skill in the art, and accordingly, additional details regarding their operation have not been included so as to not obscure the present embodiments.

Figure 4:
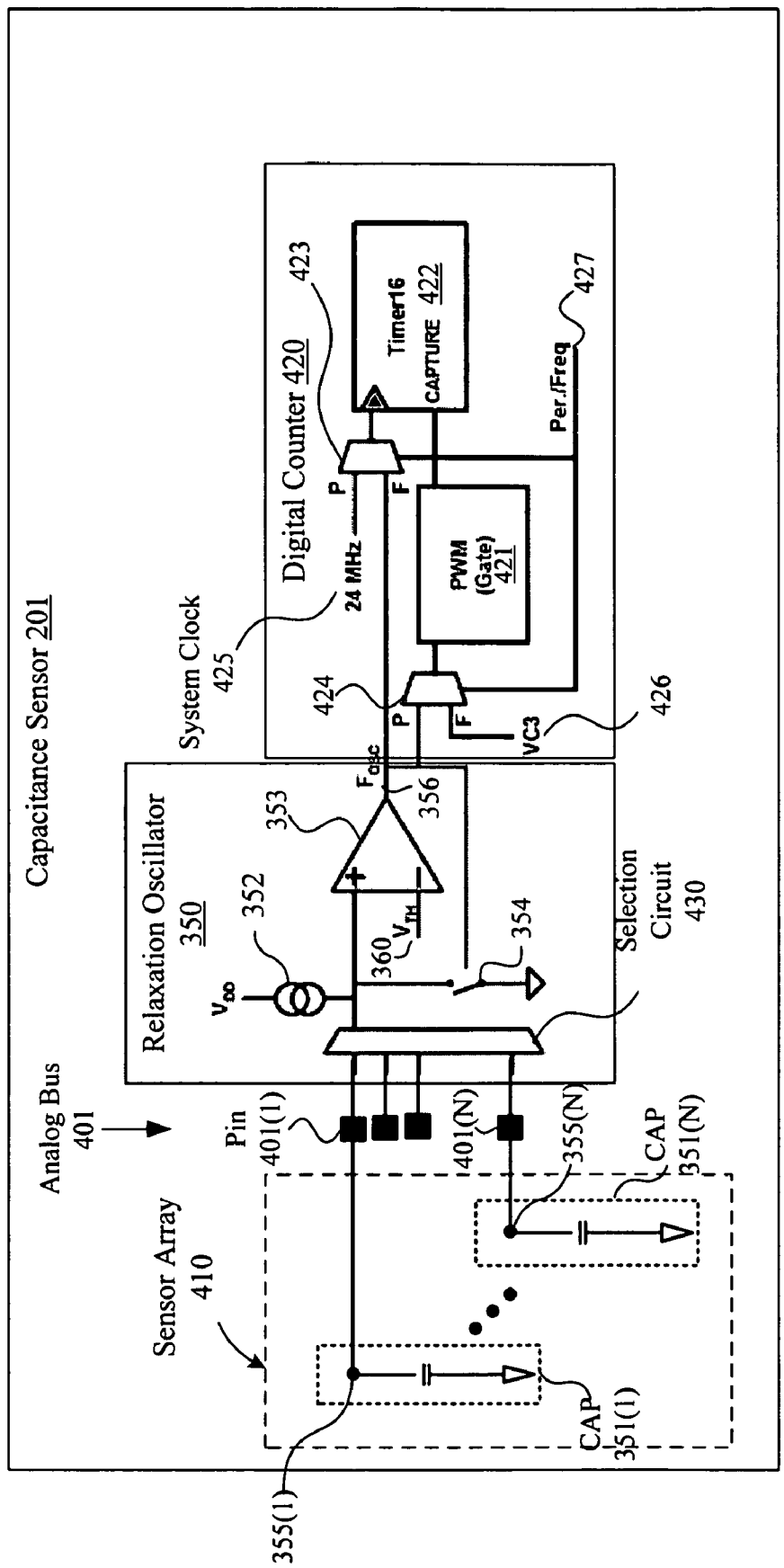
FIG. 4 illustrates a block diagram of one embodiment of a capacitance sensor including a relaxation oscillator and digital counter.

FIG. 4 illustrates a block diagram of one embodiment of a capacitance sensor including a relaxation oscillator and digital counter. Capacitance sensor 201 of FIG. 4 includes a sensor array 410 (also known as a switch array), relaxation oscillator 350, and a digital counter 420. Sensor array 410 includes sensor elements 355(1)-355(N), where N is a positive integer value that represents the number of rows (or alternatively columns) of the sensor array 410. Each sensor element is represented as a capacitor, as described above with respect to FIG. 3B. The sensor array 410 is coupled to relaxation oscillator 350 via an analog bus 401 having multiple pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231). Alternatively, the sensor array 410 may be a multi-dimension sensor array including the sensor elements 355(1)-355(N), where N is a positive integer value that represents the number of sensor elements of the multi-dimension sensor array. The multi-dimension sensor array 410 provides output data to the analog bus 401 of the processing device 210 (e.g., via bus 221).

Relaxation oscillator 350 of FIG. 4 includes all the components described with respect to FIG. 3C, and a selection circuit 430. The selection circuit 430 is coupled to the sensor elements 355(1)-355(N), the reset switch 354, the current source 352, and the comparator 353. Selection circuit 430 may be used to allow the relaxation oscillator 350 to measure capacitance on multiple sensor elements (e.g., rows or columns). The selection circuit 430 may be configured to sequentially select a sensor element of the multiple sensor elements to provide the charge current and to measure the capacitance of each sensor element. In one exemplary embodiment, the selection circuit 430 is a multiplexer array of the relaxation oscillator 350. Alternatively, selection circuit may be other circuitry outside the relaxation oscillator 350, or even outside the capacitance sensor 201 to select the sensor element to be measured. Capacitance sensor 201 may include one relaxation oscillator and digital counter for the sensor elements of the sensor array. Alternatively, capacitance sensor 201 may include multiple relaxation oscillators and digital counters to measure capacitance on the sensor elements of the sensor array. The multiplexer array may also be used to ground the sensor elements that are not being measured. This may be done in conjunction with a dedicated pin in the GP10 port 207.

In another embodiment, the capacitance sensor 201 may be configured to simultaneously scan the sensor elements, as opposed to being configured to sequentially scan the sensor elements as described above. For example, the sensing device may include a sensor array having multiple rows and columns. The rows may be scanned simultaneously, and the columns may be scanned simultaneously.

In one exemplary embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension.

In another exemplary embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

Digital counter 420 is coupled to the output of the relaxation oscillator 350. Digital counter 420 receives the relaxation oscillator output signal 356 ($F_{OUT}$). Digital counter 420 is configured to count at least one of a frequency or a period of the relaxation oscillator output received from the relaxation oscillator.

As described above with respect to the relaxation oscillator 350, when a finger or conductive object is placed on the switch, the capacitance increases from Cp to Cp+Cf so the relaxation oscillator output signal 356 ($F_{OUT}$) decreases. The relaxation oscillator output signal 356 ($F_{OUT}$) is fed to the digital counter 420 for measurement. There are two methods for counting the relaxation oscillator output signal 356, frequency measurement and period measurement. In one embodiment, the digital counter 420 may include two multiplexers 423 and 424. Multiplexers 423 and 424 are configured to select the inputs for the PWM 421 and the timer 422 for the two measurement methods, frequency and period measurement methods. Alternatively, other selection circuits may be used to select the inputs for the PWM 421 and the time 422. In another embodiment, multiplexers 423 and 424 are not included in the digital counter, for example, the digital counter 420 may be configured in one, or the other, measurement configuration.

In the frequency measurement method, the relaxation oscillator output signal 356 is counted for a fixed period of time. The counter 422 is read to obtain the number of counts during the gate time. This method works well at low frequencies where the oscillator reset time is small compared to the oscillator period. A pulse width modulator (PWM) 421 is clocked for a fixed period by a derivative of the system clock, VC3 426 (which is a divider from system clock 425, e.g., 24 MHz). Pulse width modulation is a modulation technique that generates variable-length pulses to represent the amplitude of an analog input signal; in this case VC3 426. The output of PWM 421 enables timer 422 (e.g., 16-bit). The relaxation oscillator output signal 356 clocks the timer 422. The timer 422 is reset at the start of the sequence, and the count value is read out at the end of the gate period.

In the period measurement method, the relaxation oscillator output signal 356 gates a counter 422, which is clocked by the system clock 425 (e.g., 24 MHz). In order to improve sensitivity and resolution, multiple periods of the oscillator are counted with the PWM 421. The output of PWM 421 is used to gate the timer 422. In this method, the relaxation oscillator output signal 356 drives the clock input of PWM 421. As described above, pulse width modulation is a modulation technique that generates variable-length pulses to represent the amplitude of an analog input signal; in this case the relaxation oscillator output signal 356. The output of the PWM 421 enables timer 422 (e.g., 16-bit), which is clocked at the system clock frequency 425 (e.g., 24 MHz). When the output of PWM 421 is asserted (e.g., goes high), the count starts by releasing the capture control. When the terminal count of the PWM 421 is reached, the capture signal is asserted (e.g., goes high), stopping the count and setting the PWM's interrupt. The timer value is read in this interrupt. The relaxation oscillator 350 is indexed to the next switch (e.g., capacitor 351(2)) to be measured and the count sequence is started again.

The two counting methods may have equivalent performance in sensitivity and signal-to-noise ratio (SNR). The period measurement method may have a slightly faster data acquisition rate, but this rate is dependent on software loads and the values of the switch capacitances. The frequency measurement method has a fixed-switch data acquisition rate.

The length of the counter 422 and the detection time required for the switch are determined by sensitivity requirements. Small changes in the capacitance on capacitor 351 result in small changes in frequency. In order to find these small changes, it may be necessary to count for a considerable time.

At startup (or boot) the switches (e.g., capacitors 351(1)-(N)) are scanned and the count values for each switch with no actuation are stored as a baseline array (Cp). The presence of a finger on the switch is determined by the difference in counts between a stored value for no switch actuation and the acquired value with switch actuation, referred to here as Δn. The sensitivity of a single switch is approximately:

$$\frac{\Delta n}{n} = \frac{Cf}{Cp} \qquad (4)$$

The value of Δn should be large enough for reasonable resolution and clear indication of switch actuation. This drives switch construction decisions.

Cf should be as large a fraction of Cp as possible. In one exemplary embodiment, the fraction of Cf/Cp ranges between approximately 0.01 to approximately 2.0. Alternatively, other fractions may be used for Cf/Cp. Since Cf is determined by finger area and distance from the finger to the switch's conductive traces (through the over-lying insulator), the baseline capacitance Cp should be minimized. The baseline capacitance Cp includes the capacitance of the switch pad plus any parasitics, including routing and chip pin capacitance.

In switch array applications, variations in sensitivity should be minimized. If there are large differences in Δn, one switch may actuate at 1.0 cm, while another may not actuate until direct contact. This presents a non-ideal user interface device. There are numerous methods for balancing the sensitivity. These may include precisely matching on-board capacitance with PC trace length modification, adding balance capacitors on each switch's PC board trace, and/or adapting a calibration factor to each switch to be applied each time the switch is tested.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB.

It should be noted that the count window should be long enough for Δn to be a "significant number." In one embodiment, the "significant number" can be as little as 10, or alternatively, as much as several hundred. In one exemplary embodiment, where Cf is 1.0% of Cp (a typical "weak" switch), and where the switch threshold is set at a count value of 20, n is found to be:

$$n = \Delta n \cdot \frac{Cf}{Cp} = 2000 \quad (5)$$

Adding some margin to yield 2500 counts, and running the frequency measurement method at 1.0 MHz, the detection time for the switch is 2.5 microseconds. In the frequency measurement method, the frequency difference between a switch with and without actuation (i.e., CP+CF vs. CP) is approximately:

$$\Delta n = \frac{t_{count} \cdot i_c}{V_{TH}} \frac{Cf}{Cp^2} \quad (6)$$

This shows that the sensitivity variation between one channel and another is a function of the square of the difference in the two channels' static capacitances. This sensitivity difference can be compensated using routines in the high-level Application Programming Interfaces (APIs).

In the period measurement method, the count difference between a switch with and without actuation (i.e., CP+CF vs. CP) is approximately:

$$\Delta n = N_{Periods} \cdot \frac{Cf \cdot V_{TH}}{i_C} \cdot f_{SysClk} \quad (7)$$

The charge currents are typically lower and the period is longer to increase sensitivity, or the number of periods for which $f_{SysClk}$ is counted can be increased. In either method, by matching the static (parasitic) capacitances Cp of the individual switches, the repeatability of detection increases, making all switches work approximately at the same difference. Compensation for this variation can be done in software at runtime. The compensation algorithms for both the frequency method and period method may be included in the high-level APIs.

Some implementations of this circuit use a current source programmed by a fixed-resistor value. If the range of capacitance to be measured changes, external components, (i.e., the resistor) should be adjusted.

Using the selection circuit 430, multiple sensor elements may be sequentially scanned to provide current to and measure the capacitance from the capacitors (e.g., sensor elements), as described above. In other words, while one sensor element is being measured, the remaining sensor elements are grounded using the GPIO port 207. This drive and multiplex arrangement bypasses the existing GPIO to connect the selected pin to an internal analog multiplexer (mux) bus. The capacitor charging current (e.g., current source 352) and reset switch 354 are connected to the analog mux bus. This may limit the pin-count requirement to simply the number of switches (e.g., capacitors 351(1)-351(N)) to be addressed. In one exemplary embodiment, no external resistors or capacitors are required inside or outside the processing device 210 to enable operation.

The capacitor charging current for the relaxation oscillator 350 is generated in a register programmable current output DAC (also known as IDAC). Accordingly, the current source 352 is a current DAC or IDAC. The IDAC output current may be set by an 8-bit value provided by the processing device 210, such as from the processing core 202. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

In many capacitive switch designs the two "plates" (e.g., 301 and 302) of the sensing capacitor are actually adjacent sensor elements that are electrically isolated (e.g., PCB pads or traces), as indicated in FIG. 3A. Typically, one of these plates is grounded. Layouts for touch-sensor slider (e.g., linear slide switches) and touch-sensor pad applications have switches that are immediately adjacent. In this case, all of the switches that are not active are grounded through the GPIO 207 of the processing device 210 dedicated to that pin. The actual capacitance between adjacent plates is small (Cp), but the capacitance of the active plate (and its PCB trace back to the processing device 210) to ground, when detecting the presence of the conductive object 303, may be considerably higher (Cp+Cf). The capacitance of two parallel plates is given by the following equation:

$$C = \varepsilon_0 \cdot \varepsilon_R \cdot \frac{A}{d} = \varepsilon_R \cdot 8.85 \cdot \frac{A}{d} pF/m \quad (8)$$

The dimensions of equation (8) are in meters. This is a very simple model of the capacitance. The reality is that there are fringing effects that substantially increase the switch-to-ground (and PCB trace-to-ground) capacitance.

Switch sensitivity (i.e., actuation distance) may be increased by one or more of the following: 1) increasing board thickness to increase the distance between the active switch and any parasitics; 2) minimizing PC trace routing underneath switches; 3) utilizing a grided ground with 50% or less fill if use of a ground plane is absolutely necessary; 4) increasing the spacing between switch pads and any adjacent ground plane; 5) increasing pad area; 6) decreasing thickness of any insulating overlay; or 7) verifying that there is no air-gap between the PC pad surface and the touching finger.

There is some variation of switch sensitivity as a result of environmental factors. A baseline update routine, which compensates for this variation, may be provided in the high-level APIs.

Sliding switches are used for control requiring gradual adjustments. Examples include a lighting control (dimmer), volume control, graphic equalizer, and speed control. These switches are mechanically adjacent to one another. Actuation of one switch results in partial actuation of physically adjacent switches. The actual position in the sliding switch is found by computing the centroid location of the set of switches activated.

In applications for touch-sensor sliders (e.g., sliding switches) and touch-sensor pads it is often necessary to determine finger (or other capacitive object) position to more resolution than the native pitch of the individual switches. The contact area of a finger on a sliding switch or a touch-pad is often larger than any single switch. In one embodiment, in order to calculate the interpolated position using a centroid, the array is first scanned to verify that a given switch location is valid. The requirement is for some number of adjacent switch signals to be above a noise threshold. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i i + n_{i+1}} \quad (9)$$

The calculated value will almost certainly be fractional. In order to report the centroid to a specific resolution, for example a range of 0 to 100 for 12 switches, the centroid value may be multiplied by a calculated scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multilayer stack-up of a touchpad assembly includes a PCB, an adhesive layer, and an overlay. The PCB includes the processing device 210 and other components, such as the connector to the host 250, necessary for operations for sensing the capacitance. These components are on the non-sensing side of the PCB. The PCB also includes the sensor array on the opposite side, the sensing side of the PCB. Alternatively, other multi-layer stack-ups may be used in the touchpad assembly.

The PCB may be made of standard materials, such as FR4 or Kapton™ (e.g., flexible PCB). In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield better results. The PCB length and width is dependent on individual design requirements for the device on which the sensing device is mounted, such as a notebook or mobile handset.

The adhesive layer is directly on top of the PCB sensing array and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object) from the circuitry. Overlay can be ABS plastic, polycarbonate, glass, or Mylar™. Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as finger, to a resolution greater than that which is native. The touch-sensor pad layout pattern maximizes the area covered by conductive material, such as copper, in relation to spaces necessary to define the rows and columns of the sensor array.

Figure 5A:
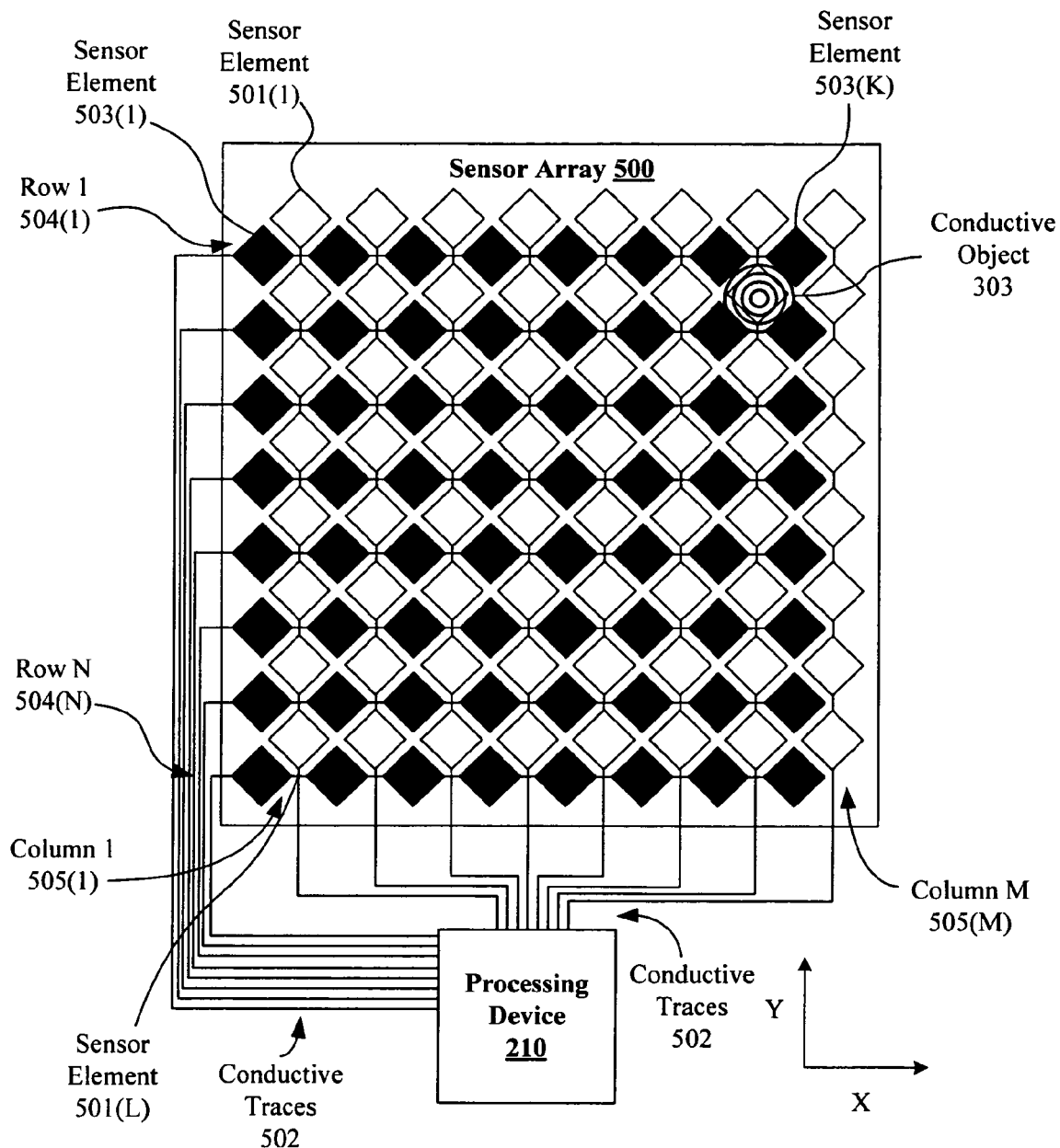
FIG. 5A illustrates a top-side view of one embodiment of a sensor array of sensor elements for detecting a presence of a conductive object on the sensor array of a touch-sensor pad.

FIG. 5A illustrates a top-side view of one embodiment of a sensor array of sensor elements for detecting a presence of a conductive object 303 on the sensor array 500 of a touch-sensor pad. Touch-sensor pad 220 includes a sensor array 500. Sensor array 500 includes rows 504(1)-504(N) and columns 505(1)-505(M), where N is a positive integer value representative of the number of rows and M is a positive integer value representative of the number of columns. Each row includes sensor elements 503(1)-503(K), where K is a positive integer value representative of the number of sensor elements in the row. Each column includes a sensor elements 501(1)-501(L), where L is a positive integer value representative of the number of sensor elements in the column. Accordingly, sensor array is an N×M sensor matrix. The N×M sensor matrix, in conjunction with the processing device 210, is configured to detect a position of a presence of the conductive object 303 in the x-, and y-directions.

Figure 5B:
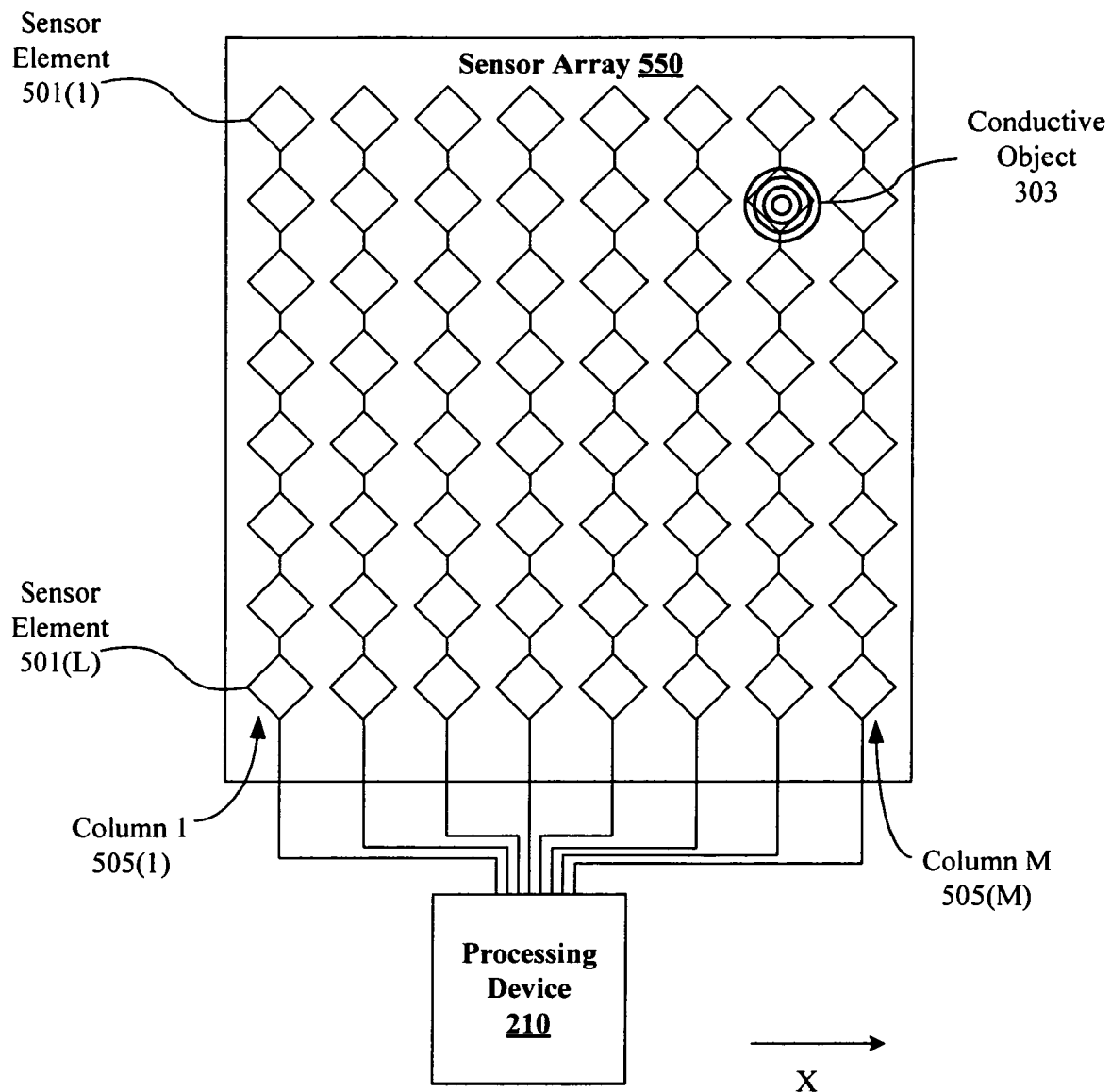
FIG. 5B illustrates a top-side view of one embodiment of a sensor array of sensor elements for detecting a presence of a conductive object on the sensor array of a touch-sensor slider.

FIG. 5B illustrates a top-side view of one embodiment of a sensor array of sensor elements for detecting a presence of a conductive object 303 on the sensor array 550 of a touch-sensor slider. Touch-sensor slider 230 includes a sensor array 550. Sensor array 550 includes columns 504(1)-504(M), where M is a positive integer value representative of the number of columns. Each column includes sensor elements 501(1)-501(L), where L is a positive integer value representative of the number of sensor elements in the column. Accordingly, sensor array is a 1×M sensor matrix. The 1×M sensor matrix, in conjunction with the processing device 210, is configured to detect a position of a presence of the conductive object 303 in the x-direction. It should be noted that sensor array 500 may be configured to function as a touch-sensor slider 230.

Alternating columns in FIG. 5A correspond to x- and y-axis elements. The y-axis sensor elements 503(1)-503(K) are illustrated as black diamonds in FIG. 5A, and the x-axis sensor elements 501(1)-501(L) are illustrated as white diamonds in FIG. 5A and FIG. 5B. It should be noted that other shapes may be used for the sensor elements. In another embodiment, the columns and row may include vertical and horizontal bars (e.g., rectangular shaped bars); however, this design may include additional layers in the PCB to allow the vertical and horizontal bars to be positioned on the PCB so that they are not in contact with one another.

Figure 5C:
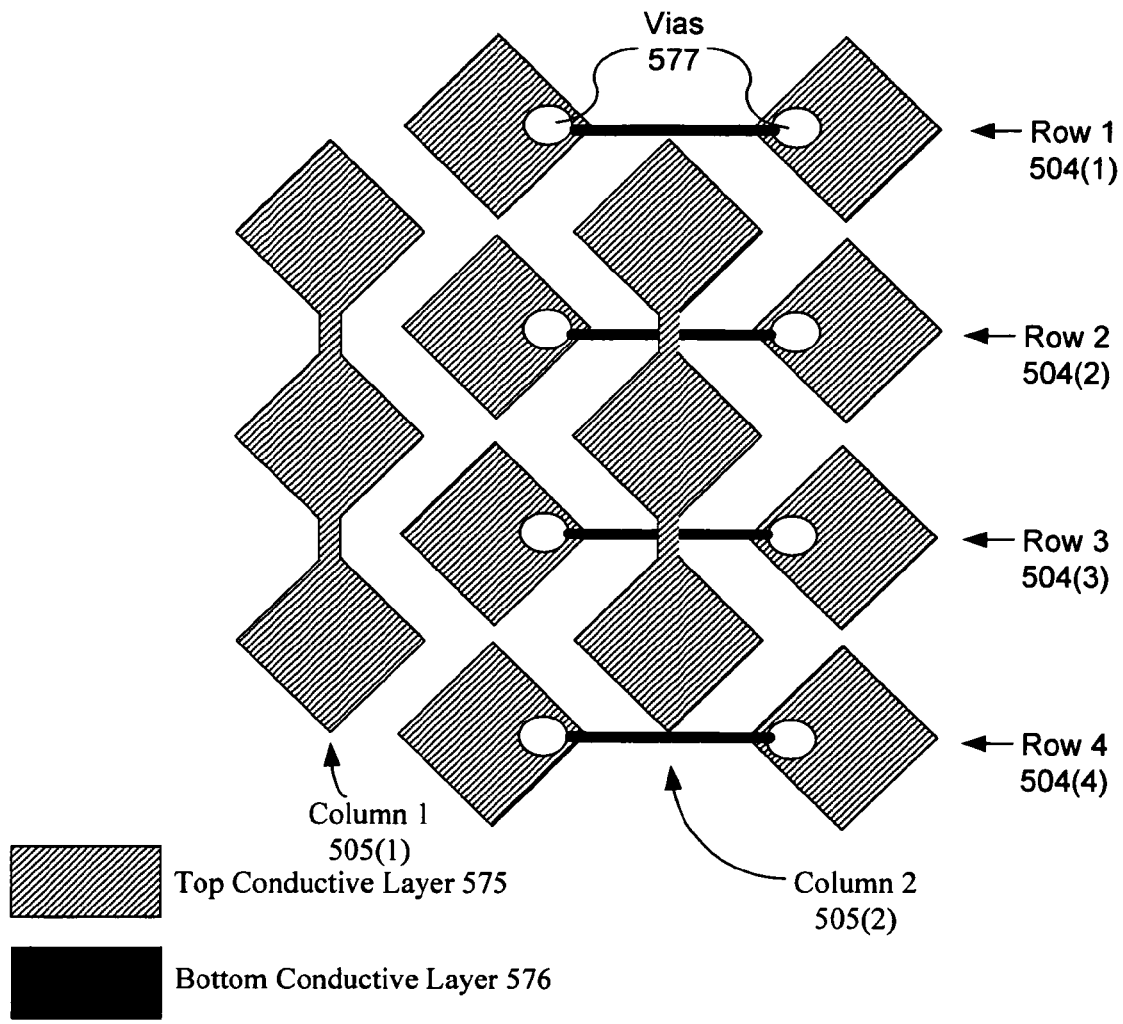
FIG. 5C illustrates a top-side view of one embodiment of a two-layer touch-sensor pad.
Figure 5D:
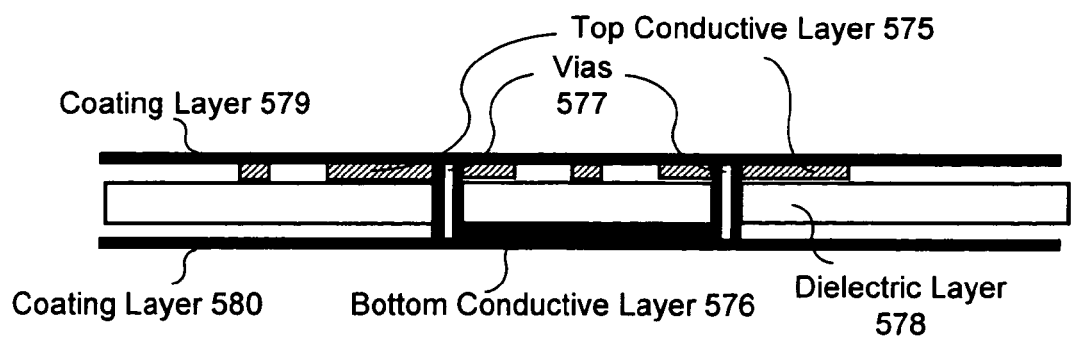
FIG. 5D illustrates a side view of one embodiment of the two-layer touch-sensor pad of FIG. 5C.

FIGS. 5C and 5D illustrate top-side and side views of one embodiment of a two-layer touch-sensor pad. Touch-sensor pad, as illustrated in FIGS. 5C and 5D, include the first two columns 505(1) and 505(2), and the first four rows 504(1)-504(4) of sensor array 500. The sensor elements of the first column 501(1) are connected together in the top conductive layer 575, illustrated as hashed diamond sensor elements and connections. The diamond sensor elements of each column, in effect, form a chain of elements. The sensor elements of the second column 501(2) are similarly connected in the top conductive layer 575. The sensor elements of the first row 504(1) are connected together in the bottom conductive layer 576 using vias 577, illustrated as black diamond sensor elements and connections. The diamond sensor elements of each row, in effect, form a chain of elements. The sensor elements of the second, third, and fourth rows 504(2)-504(4) are similarly connected in the bottom conductive layer 576.

As illustrated in FIG. 5D, the top conductive layer 575 includes the sensor elements for both the columns and the rows of the sensor array, as well as the connections between the sensor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 580 are applied to the surfaces opposite to the surfaces that are coupled to the dielectric layer 578 on both the top and bottom conductive layers 575 and 576.

It should be noted that the space between coating layers 579 and 580 and dielectric layer 578, which does not include any conductive material, may be filled with the same material as the coating layers or dielectric layer. Alternatively, it may be filled with other materials.

It should be noted that the present embodiments are not be limited to connecting the sensor elements of the rows using vias to the bottom conductive layer 576, but may include connecting the sensor elements of the columns using vias to the bottom conductive layer 576. Furthermore, the present embodiments are not limited two-layer configurations, but may include disposing the sensor elements on multiple layers, such as three- or four-layer configurations.

When pins are not being sensed (only one pin is sensed at a time), they are routed to ground. By surrounding the sensing device (e.g., touch-sensor pad) with a ground plane, the exterior elements have the same fringe capacitance to ground as the interior elements.

In one embodiment, an IC including the processing device 210 may be directly placed on the non-sensor side of the PCB. This placement does not necessary have to be in the center. The processing device IC is not required to have a specific set of dimensions for a touch-sensor pad, nor a certain number of pins. Alternatively, the IC may be placed somewhere external to the PCB.

Figure 6A:
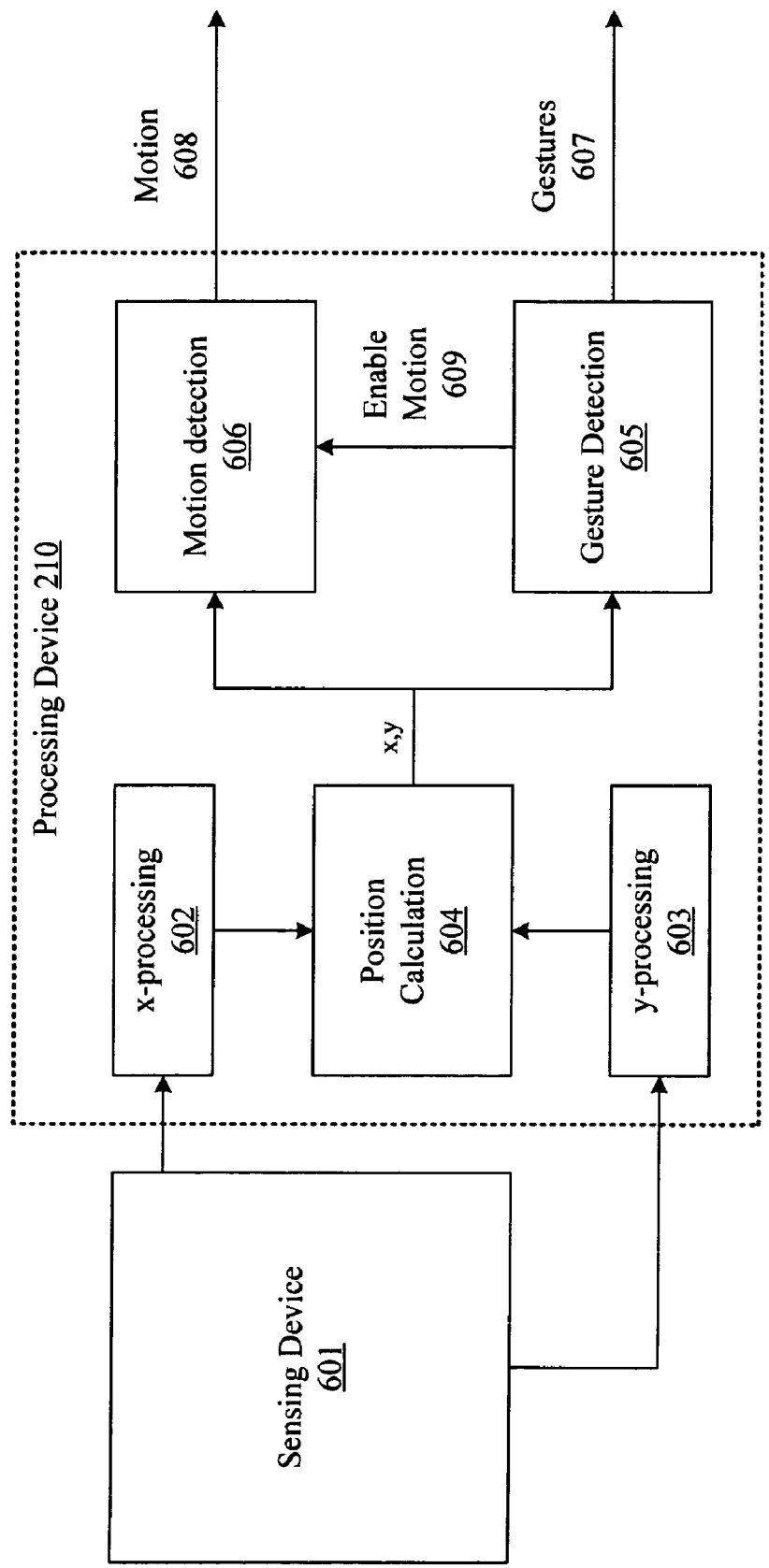
FIG. 6A illustrates a block diagram of one embodiment of processing device having gesture and motion detection blocks.

FIG. 6A illustrates a block diagram of one embodiment of processing device having gesture and motion detection blocks. Processing device 210 is coupled to sensing device 601. Sensing device 601 may be a touch-sensor pad, touch-sensor slider, or a touch-sensor button. In the following description of FIG. 6A the sensing device 601 is described as being a touch-sensor pad for detecting x/y movement and gestures. Sensing device 601 is configured to detect the presence and absence of a conductive object. Processing device 210 includes processing block 602, which is used to process the measurements made on the sensor elements of sensing device that correspond to the x-axis, and processing block 603, which is used to process the measurements made on the sensor elements of the sensing device that correspond to the y-axis. Processing blocks 602 and 603 are coupled to position calculation block 604, which is used to determine the position of the presence of the conductive object on the sensing device 601. The position calculation block 604 is coupled to motion detection block 606 and gesture detection block 605. Motion detection block 606 is configured to determine the motion 608 of the conductive object on the sensing device 601. Whether the motion 608 is sent to the host, or not, may depend on the gesture detection block 605. Gesture detection block 605 is configured to detect gestures performed by the conductive object on the sensing device 601, such as tap, double tap, and drag gestures. Gesture detection block 605 distinguishes between multiple gestures using fewer than three time intervals, as described in more detail below. Upon distinguishing which gesture, if any, the gesture detection block 605 outputs gestures 607. Gestures 607 may be a tap, double tap, drag, zigzag, hop, push, drag extension, or locking drag gestures.

In one embodiment, the gesture detection block 605 may send an enable motion signal 609 to the motion detection block 606 to enable the motion detection block 606 to output motion 608. This may be done in response to detecting that no other gesture is detected, and that only movement of the conductive object on the sensing device 601 is detected. Alternatively, motion detection block 606 and gesture detection block 605 may be implemented in a single block and output both motion 608 and gestures 607 upon detecting a motion gesture or non-motion gestures, respectively.

Figure 6B:
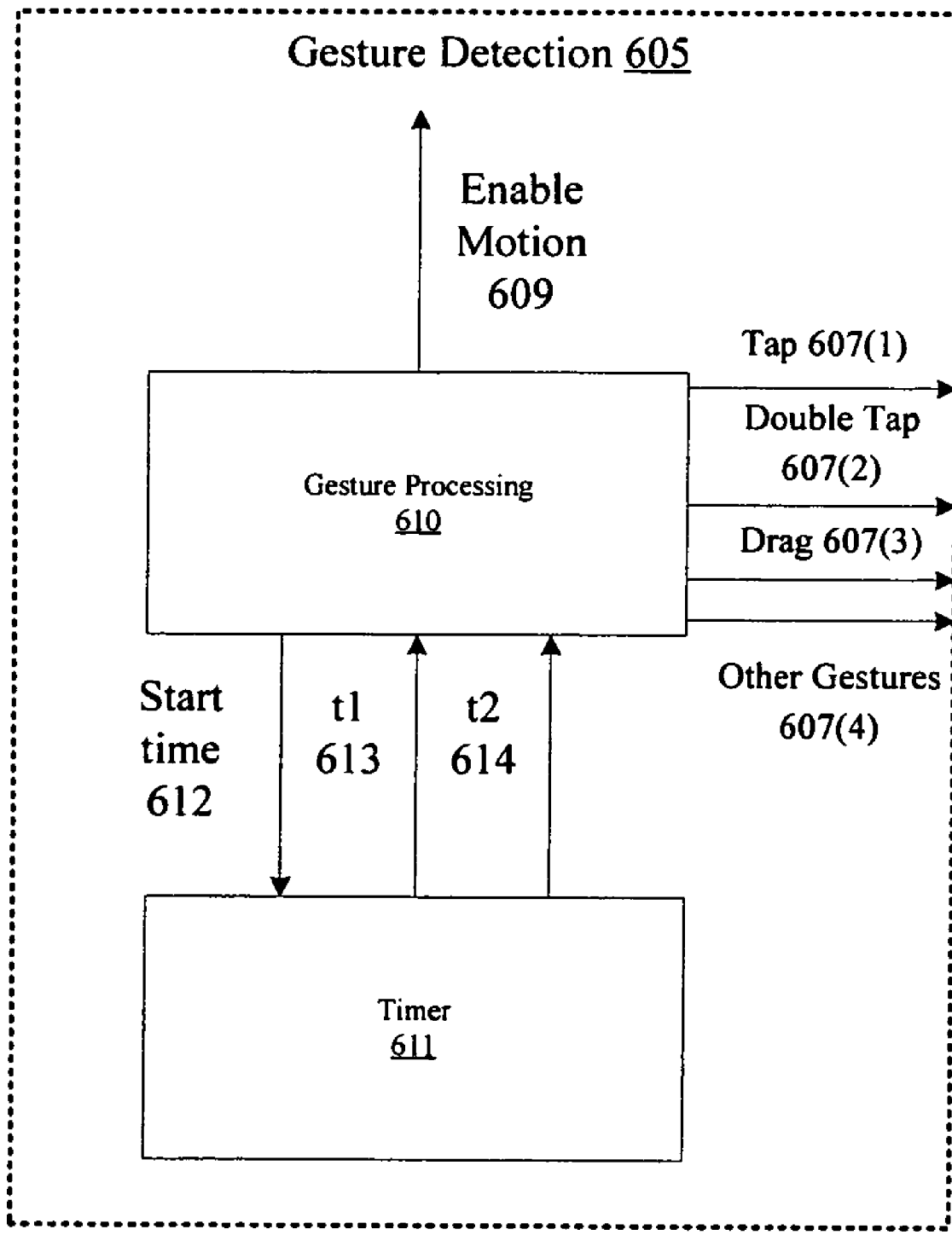
FIG. 6B illustrates a block diagram of one embodiment of the gesture detection block.

FIG. 6B illustrates a block diagram of one embodiment of the gesture detection block. Gesture block 605 includes gesture processing clock 610 and timer 611. Gesture processing block 610 is coupled to the timer 611. Gesture processing block 610 detects that a presence of the conductive object on the sensing device 601. Upon detecting the presence of the conductive object it sends a signal, start time 612 (t0), to timer 611. Start time 612 is configured to start the timer 611. Timer 611 has two timeouts, first and second timeouts 613 and 614. Using the first and second timeouts 613 and 614, gesture processing block 610 distinguishes a particular gesture from among multiple gestures at the end of the time interval. In one embodiment, the gesture processing block 610 uses one time interval, which starts with start time 612 and ends with the second timeout 614. Alternatively, the gesture processing block 610 uses two time intervals. The first time interval starts with the start time 612 and ends with the first timeout 613. The second time interval starts with either the start time 612 or the first timeout 613 and ends with the second timeout 614. The gesture processing block 610 may distinguish between gestures regardless of the time between presences of the conductive object on the sensing device 601.

Figure 9:
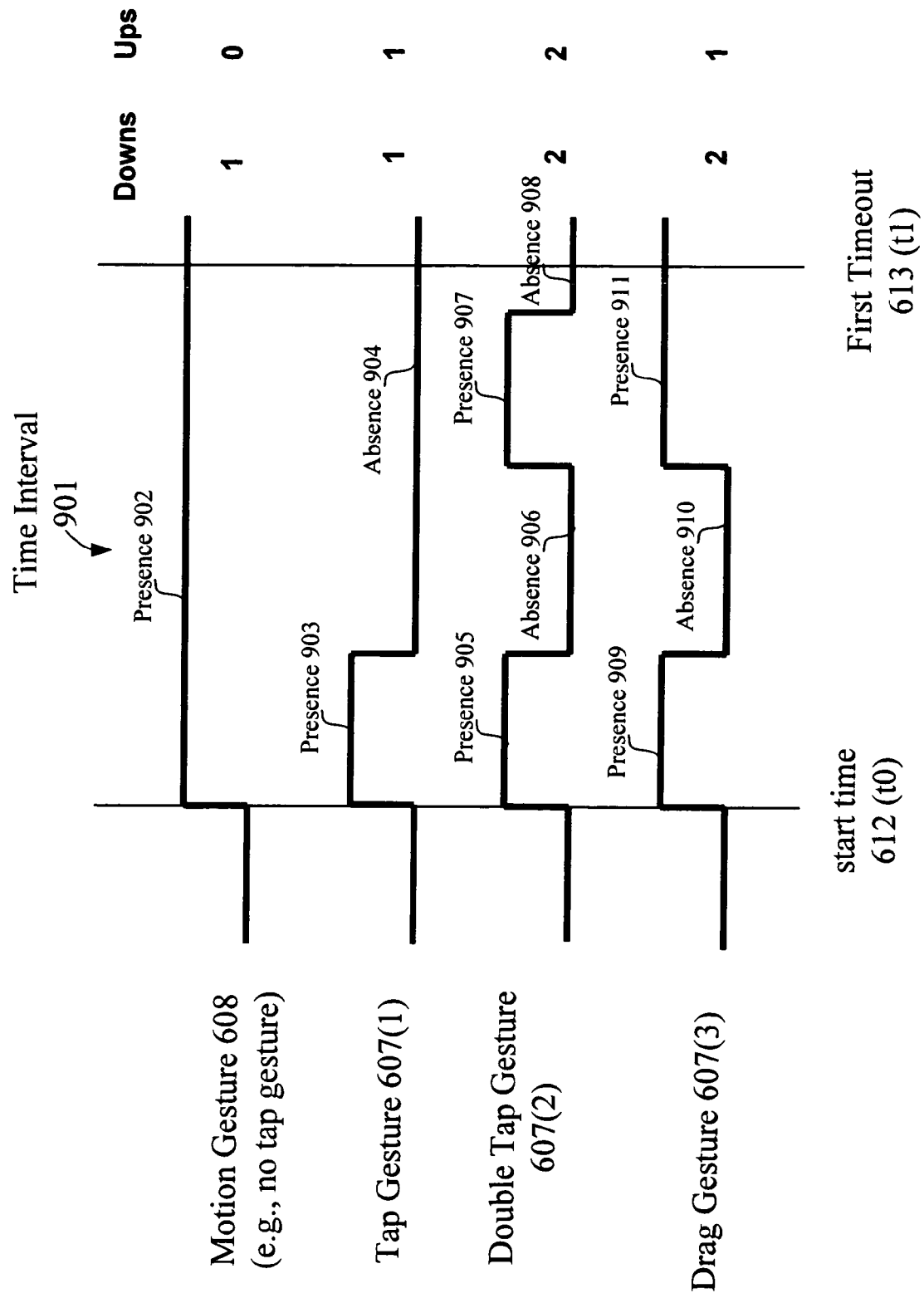
FIG. 9 illustrates a graphical representation of one embodiment of the timing of multiple gestures performed by the conductive object on the sensing device during one time interval.

In one embodiment, the gesture processing block 610 may determine how many times the presence of the conductive object is detected in one time interval to distinguish between multiple gestures (as illustrated in FIG. 9). In one embodiment, the gesture processing block 610 determines a number of times the conductive object moves away from the sensing device, and a number of times the conductive object is detected on the sensing device before the end of the one time interval. For example, a tap gesture is recognized when the number of times the conductive object moves away from the sensing device is equal to one during the first time period, the number of times the conductive object is detected on the sensing device is equal to one during the first time period, the number of times the conductive object moves away from the sensing device is equal to zero during the second time period, and the number of times the conductive object is detected on the sensing device is equal to zero during the second time period. A double tap gesture is recognized when the number of times the conductive object moves away from the sensing device is equal to two and the number of times the conductive object is detected on the sensing device is equal to two. A drag gesture is recognized when the number of times the conductive object moves away from the sensing device is equal to one and the number of times the conductive object is detected on the sensing device is equal to two. A motion gesture is recognized when the number of times the conductive object moves away from the sensing device is equal to zero and the number of times the conductive object is detected on the sensing device is equal to one.

Figure 8:
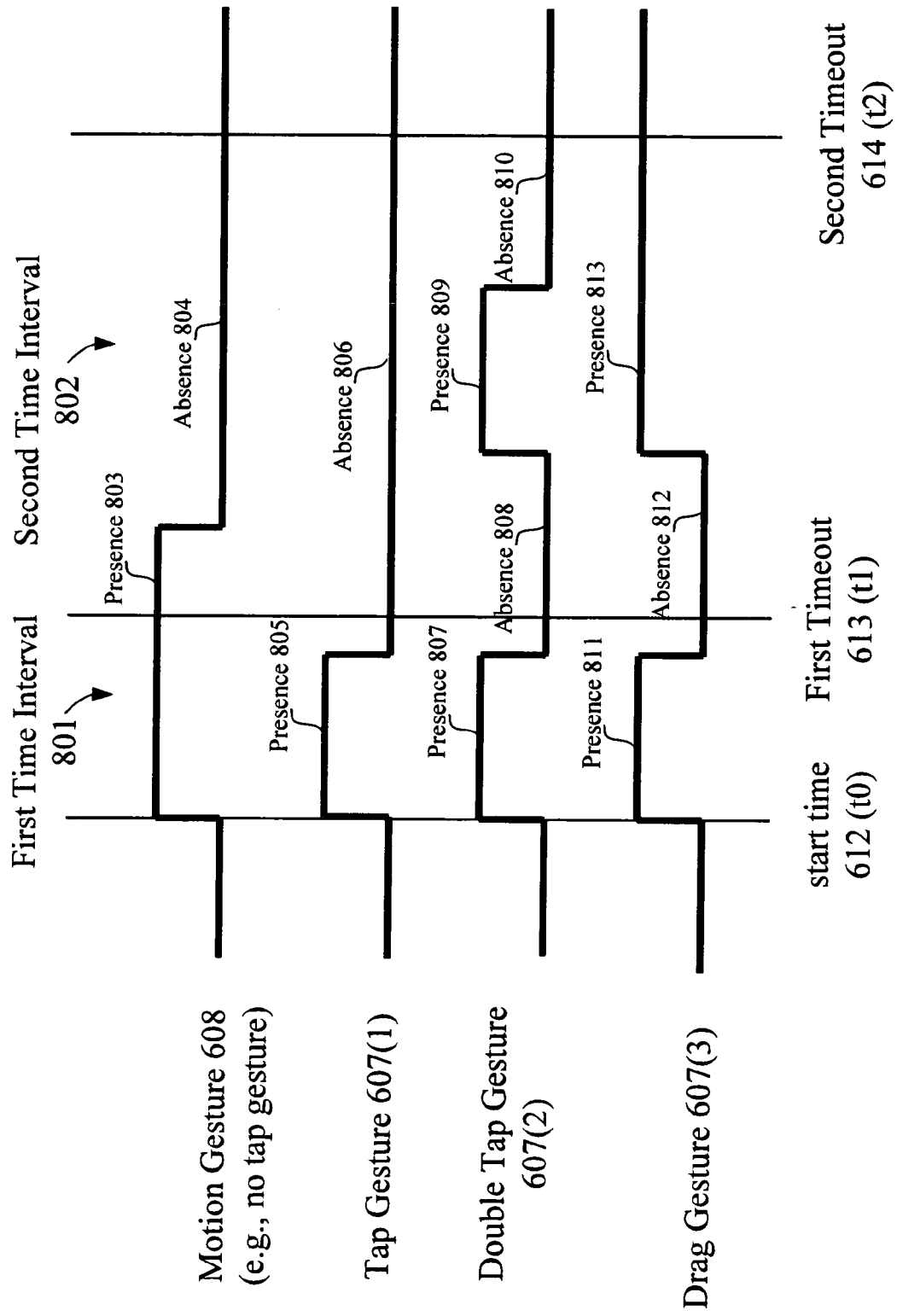
FIG. 8 illustrates a graphical representation of one embodiment of the timing of multiple gestures performed by the conductive object on the sensing device during two time intervals.

In one embodiment, the gesture processing block 610 may determine how many times the presence of the conductive object is detected in two time intervals to distinguish between multiple gestures (as illustrated in FIG. 8). In one embodiment, the gesture processing block 610 determines a number of times the conductive object moves away from the sensing device, and a number of times the conductive object is detected on the sensing device before the end of each time interval. For example, a tap gesture is recognized when the number of times the conductive object moves away from the sensing device is equal to one during the first time period, the number of times the conductive object is detected on the sensing device is equal to one during the first time period, the number of times the conductive object moves away from the sensing device is equal to zero during the second time period, and the number of times the conductive object is detected on the sensing device is equal to zero during the second time period. A double tap gesture is recognized when the number of times the conductive object moves away from the sensing device is equal to one during the first time period, the number of times the conductive object is detected on the sensing device is equal to one during the first time period, the number of times the conductive object moves away from the sensing device is equal to one during the second time period, and the number of times the conductive object is detected on the sensing device is equal to one during the second time period. A drag gesture is recognized when the number of times the conductive object moves away from the sensing device is equal to one during the first time period, the number of times the conductive object is detected on the sensing device is equal to one during the first time period, the number of times the conductive object moves away from the sensing device is equal to zero during the second time period, and the number of times the conductive object is detected on the sensing device is equal to one during the second time period. A motion gesture is recognized when the number of times the conductive object moves away from the sensing device is equal to zero during the first time period, the number of times the conductive object is detected on the sensing device is equal to one during the first time period, the number of times the conductive object moves away from the sensing device is equal to zero during the second time period, and the number of times the conductive object is detected on the sensing device is equal to one during the second time period.

As previously mentioned, gesture processing block 610 distinguishes a particular gesture from among multiple gestures, performed by the conductive object on the sensing device, using fewer than three time intervals. For example, a tap gesture is recognized when the presence of the conductive object (the presence that triggered the start time 612) is no longer detected before an end of the first time interval (e.g., when timer 611 sends the first timeout 613 signal to gesture processing block 610), and a subsequent presence of the conductive object is not detected by an end of a second time interval (e.g., when timer 611 sends the second timeout 614 signal to gesture processing block 610). Upon detecting a tap gesture, the gesture processing block 610 outputs tap gesture signal 607(1). Similarly, upon detecting a double tap or drag gesture, the processing block 610 outputs double tap gesture signal 607(2) or drag gesture signal 607(3), respectively. Alternatively, gesture processing block 610 may be configured to detect other gestures on the sensing device 601, and output other gesture signals 607(4).

In one embodiment, a double tap gesture is recognized when the presence of the conductive object is no longer detected before an end of a first time interval, and a subsequent presence is detected during a second time interval, but is no longer detected by an end of the second time interval. In another embodiment, a drag gesture is recognized when the presence of the conductive object is no longer detected before an end of a first time interval, and a subsequent presence is detected during a second time interval and remains detected by an end of the second time interval. In another embodiment, a motion gesture is recognized when the presence of the conductive object remains detected at an end of a first time interval.

Figure 7:
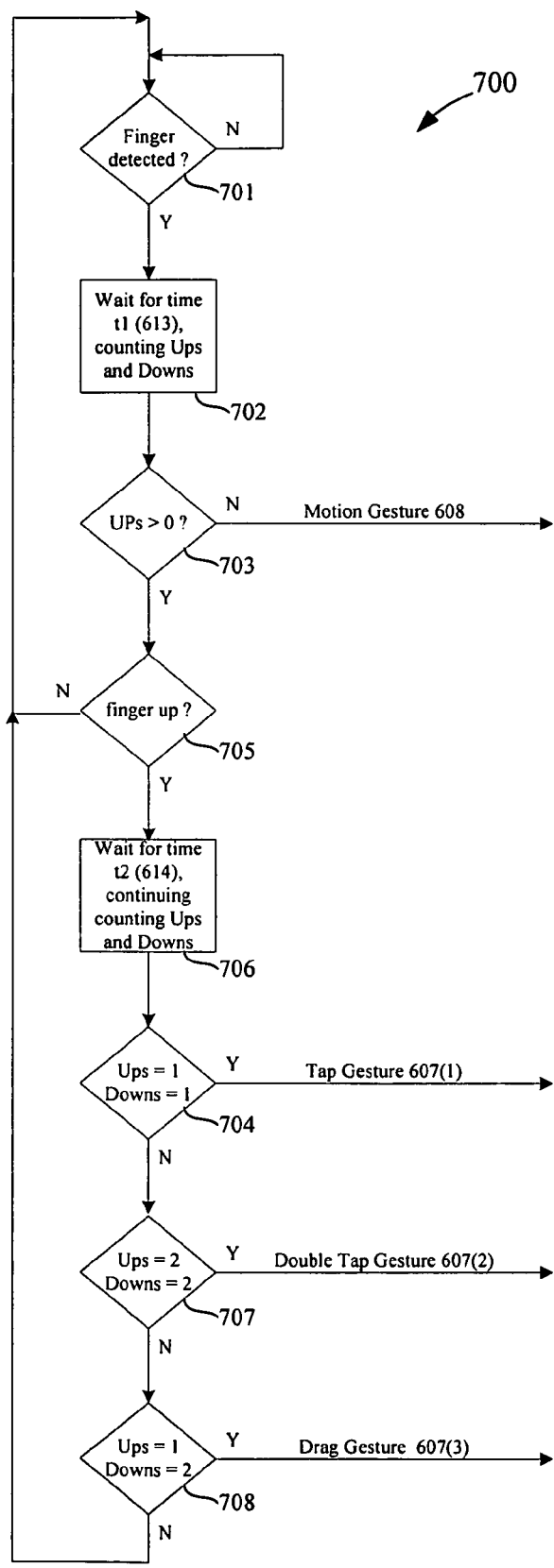
FIG. 7 illustrates a flowchart of one embodiment of a method for distinguishing gestures on a sensing device.

FIG. 7 illustrates a flowchart of one embodiment of a method for distinguishing gestures on a sensing device. Method 700 includes multiple operations to distinguish a particular gesture on a sensing device between multiple gestures using two time intervals. The method includes determining whether a finger (e.g., conductive object) is detected on the sensing device, operation 701. If no finger is detected, the operation 701 is repeated until one is detected. After the finger is detected, the processing device 210 determines how many "finger-up" and "finger-down" events are detected before the end of the first time interval, indicated by the first timeout 613, operation 702. A "finger-up" event is determined when the conductive object moves away from the sensing device after the sensing device has detected that presence of the conductive object. A "finger-down" event is determined when the conductive object is detected on the sensing device after the sensing device has not detected the presence of the conductive object. In other words, the "finger-up" and "finger-down" events indicate the transitions between the conductive object being present and absent on the sensing device. After the number of "finger-up" and "finger-down" events has been determined, the method includes determining whether the number of "finger-up" events is greater than zero during the first time interval (e.g., before the first timeout 613), operation 703. If the number of "finger-up" events is not greater than zero, then motion gesture 608 is detected. In other words, if the presence of the conductive object remains detected at an end of the first time interval, indicated by the first timeout 613, the motion gesture 608 is detected.

However, if this condition is met (e.g., the number of "finger-up" events is greater than zero), then the method proceeds to operation 705, which includes determining whether the finger is up (e.g., removed) from the sensing device. If the number of "finger-up" events is greater than zero, then motion gesture 608 is not detected at the end of the first time interval. If the finger is not up from the sensing device, then the method returns to operation 701. Operation 705 is an error trap. If at the first timeout 613 (t1) the finger is not up (i.e., finger is down), but a motion gesture was not detected, an error has occurred (as can be seen in FIG. 8). This error trap may result from electrical noise, or some other error. Without this error trap, a double tap or drag gesture may be erroneously detected. In another embodiment, the method may not include the error trap of operation 705. Conversely, if the finger is up from the sensing device, the processing device 210 again determines how many "finger-up" and "finger-down" events are detected before the end of the second time interval, indicated by the second timeout 614, operation 706. After the number of "finger-up" and "finger-down" events has been determined at the end of the second time interval, the method proceeds to operation 704, which includes determining whether the number of "finger-up" events is equal to one, and the number of "finger-down" events is equal to one. If this condition is met, a tap gesture 607(*a*) is detected. If this condition is not met, then the tap gesture (607(1) is not detected, and the method proceeds to operation 707, which includes determining whether the number of "finger-up" events is equal to two and the number of "finger-down" events is equal to two during the second time interval (e.g., before the second timeout 614), operation 707. If this condition is met, then the double tap gesture 607(2) is detected. If this condition is not met, then the double tap gesture 607(2) is not detected, and the method proceeds to operation 708, which includes determining whether the number of "finger-up" events is equal to one and the number of "finger-down" events is equal to two during the second time interval (e.g., before the second timeout 614), operation 708. If this condition is met, then the drag gesture 607(3) is detected. In other words, if the presence of the conductive object remains detected at an end of the second time interval, indicated by the second timeout 614, the drag gesture 607(3) is detected.

In one embodiment, the method for recognizing a tap gesture made on a sensing device of the electronic system includes the operations of: 1) detecting a first presence of a conductive object on the sensing device; 2) comparing the duration of said first presence with a first reference amount of time; 3) waiting for a second reference amount of time; and 4) initiating a signal to the host indicating the occurrence of said gesture if the duration of said first presence is less than said first reference amount of time, and no second presence is detected with said second reference amount of time. Alternatively, the method for recognizing a tap gesture may include determining if the presence of the conductive object is no longer detected before an end of a first time interval, and a subsequent presence is not detected by an end of a second time interval.

In one embodiment, the method for recognizing a double tap gesture made on a sensing device of the electronic system includes the operations of: 1) detecting a first presence of a conductive object on the touch-sensor pad; 2) comparing the duration of said first presence with a first reference amount of time; 3) initiating a first signal to the host indicating the occurrence of said gesture if the duration of said first presence is less than said first reference amount of time; 4) terminating said first signal if a second reference amount of time passes before a second presence is detected; 5) detecting a second presence of said conductive object on the touch-sensor pad; 6) terminating said first signal if the duration of said second presence ends after said second reference amount of time; and 7) sending a second signal to said host indicating said second gesture after the termination of said first signal. Alternatively, the method for recognizing a double tap gesture may include determining if the presence of the conductive object is no longer detected before an end of a first time interval, and a subsequent presence is detected during a second time interval, but is no longer detected by an end of the second time interval.

In another embodiment, the method for recognizing a drag gesture made on a sensing device of the electronic system includes the operations of: 1) detecting a first presence of a conductive object on the touch-sensor pad; 2) comparing the duration of said first presence with a first reference amount of time; 3) initiating a gesture signal to the host indicating the occurrence of a gesture if the duration of said first presence is less than said first reference amount of time; 4) detecting a second presence of said conductive object on the touch-sensor pad; 5) detecting whether said second presence persists after a second reference amount of time; and 6) maintaining said drag gesture signal and repeatedly sending information containing an indication of X and Y position (or a change thereof) to said host for the duration of said second presence, said second presence persists after a second reference amount of time. The method may further include providing an indication of X and Y position information to a host in conjunction with recognizing the drag gesture. Alternatively, the method for recognizing a drag gesture may include determining if the presence of the conductive object is no longer detected before an end of a first time interval, and a subsequent presence is detected during a second time interval and remains detected by an end of the second time interval.

In one embodiment, the method for recognizing a motion gesture includes determining if the presence of the conductive object remains detected at an end of a first time interval. Alternatively, other operations may be used to recognize when no other gestures are recognized to allow movement of the conductive object to be sent to the host.

FIG. 8 illustrates a graphical representation of one embodiment of the timing of multiple gestures performed by the conductive object on the sensing device during two time intervals. As described above, the processing device is configured to distinguish a particular gesture from among multiple gestures, performed by a conductive object on the sensing device, using fewer than three time intervals. Graph 800 includes two time intervals 801 and 802. The first time interval 801 is started by start time 612 (t0) and ends with the first timeout 613 (t1). The second time interval 802 is started by the first timeout 613 (t1) and ends with the second timeout 614 (t2).

As described above, motion gesture 608 is recognized when the presence of the conductive object, presence 803, remains detected at an end of a first time interval, indicated by first timeout 613. The conductive object may, or may not, move away from the sensing device 601 during the second timer interval, as indicated by absence 804. Tap gesture 607 (1) is recognized when the presence of the conductive object (presence 805 that triggered the start time 612) is no longer detected before an end of the first time interval (e.g., indicated by the first timeout 613), and a subsequent presence of the conductive object is not detected by an end of a second time interval (e.g., indicated by the detecting absence 806 up to the second timeout 614). Double tap gesture 607(2) is recognized when the presence of the conductive object, presence 807, is no longer detected before an end of a first time interval (e.g., indicated by the first timeout 613), and a subsequent presence, presence 809, is detected during a second time interval (e.g., indicated by the second timeout 614), but is no longer detected by an end of the second time interval (e.g., indicated by the second time out 614). In this embodiment, both the presences 807 and 809 and the absences 808 and 810 are detected in each time interval, respectively. Drag gesture 607(3) is recognized when the presence of the conductive object, presence 811, is no longer detected before an end of a first time interval (e.g., indicated by the first timeout 613), and a subsequent presence, presence 813 is detected during a second time interval (e.g., indicated by the second timeout 614) and remains detected by an end of the second time interval (e.g., indicated by the first timeout 613). In this embodiment, only one absence, absence 812, is detected starting in the first time interval.

In another embodiment, the number of ups and downs may be counted during the two time intervals, and accordingly, the motion gesture is recognized when the number of "finger-up" events is equal to zero and the number of "finger-down" events is equal to one during the first time interval. The number of "finger-up" events during the second time period can be equal to one or zero. For the other three gestures, both the number of "finger-up" and "finger-down" events are equal to one during the first time interval, ending at the first timeout 613. However, during the second time interval, the number of "finger-up" and "finger-down" events differ for the three gestures. For tap gesture 607(1) to be recognized, the number of "finger-up" events is equal to zero and the number of "finger-down" events is equal to zero during the second time interval, ending at the second timeout 614. For double tap gesture 607(2) to be recognized, the number of "finger-up" events is equal to one and the number of "finger-down" events is equal to one during the second time interval, ending at the second timeout 614. For drag gesture 607(3) to be recognized, the number of "finger-up" events is equal to zero and the number of "finger-down" events is equal to one during the second time interval, ending at the second timeout 614.

In one embodiment, the gesture processing may be performed using a single timer with two timeouts, first and second timeouts 613 and 614. The single timer may be restarted at the end of the first time interval (e.g., at first timeout 614 (t1)), such that the value of the second timeout, second timeout 614 (t2), is equal to the time at the end of the second time interval less the time at the end of the first time interval (e.g., t2−t1). Alternatively, the gesture processing may be performed using two timers, each with timeouts. In this embodiment, both timers may be started at start time 612 (t0), with the first timer detecting the first timeout 613 (t1) and the second timer detecting the second timeout 614 (t2). Alternatively, the second timer may be started at the end of the first time interval (e.g., indicated by the first timeout 613 (t1)) and end at a second time out 614 (t2−t1).

In this embodiment, a single timer is used to count the number of "finger-down" and "finger-up" events in a single time period after a finger presence is first detected. If no "finger-up" event is detected after the initiating "finger-down" event, then no gesture is detected, and the touch-sensor pad performs normal x/y operations (e.g., motion gesture 608). If a single "finger-up" event is detected and no further "finger-down" event is detected, then a single tap gesture (e.g., 607(1)) is inferred. If a total of two "finger-down" events and two "finger-up" events are detected, then a double-tap gesture (e.g., 607(2)) is inferred. If a total of two "finger-down" events and a single "finger-up" event is detected than a drag gesture (e.g., 607(3)) is inferred.

FIG. 9 illustrates a graphical representation of one embodiment of the timing of multiple gestures performed by the conductive object on the sensing device during one time interval. Graph 800 includes one time intervals 901. Time interval 901 is started by start time 612 (t0) and ends with the first timeout 613 (t1). Alternatively, the time interval 901 may end with the second timeout 614 (t2).

As described above, motion gesture 608 is recognized when the presence of the conductive object, presence 902, remains detected at an end of a first time interval, indicated by first timeout 613. Tap gesture 607(1) is recognized when the presence of the conductive object, presence 903, is no longer detected before an end of the first time interval at first timeout 613. Double tap gesture 607(2) is recognized when the presence of the conductive object is detected twice before the end of the first timeout 613. In this embodiment, both the presences 905 and 907 and the absences 906 and 908 are detected in the time interval 901. Drag gesture 607(3) is recognized when the presence of the conductive object is detected twice before the end of the first timeout 613. However, in this embodiment, the subsequent presence, presence 911 remains detected by an end of the time interval 901 at first timeout 613. In this embodiment, only one absence, absence 910, is detected in the time interval 901.

In another embodiment, the number of ups and downs may be counted during the two time intervals, and accordingly, motion gesture 608 is recognized when the number of times the conductive object moves away from the sensing device is equal to zero and the number of times the conductive object is detected on the sensing device is equal to one. Tap gesture 607(1) is recognized when the number of "finger-up" events is equal to one, and the number of "finger-down" events is equal to one. Double tap gesture 607(2) is recognized when the number of "finger-up" events is equal to two, and the number of "finger-down" events is equal to two. Drag gesture 607(3) is recognized when the number of "finger-up" events is equal to one, and the number of "finger-down" events is equal to two.

The embodiments described herein may be advantageous by allowing the detection of multiple gestures using a single timer with only 2 timeouts, or even one timer with one timeout, rather than multiple timers and/or three or more timeout periods.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
    detecting an initial presence of a conductive object on a sensing device; and
    distinguishing a particular gesture from among at least three gestures, performed by the conductive object on the sensing device, wherein said distinguishing comprises:
        in response to said detecting the initial presence, starting a first timer and a second timer;
        at an expiration of the first timer, determining whether the initial presence of the conductive object is still detected or absent;
        determining whether a subsequent presence of the conductive object is detected on the sensing device after the expiration of the first timer; and
        at an expiration of the second timer, determining whether the subsequent presence of the conductive object is still detected or absent, wherein said distinguishing the particular gesture comprises distinguishing the particular gesture using the results of said determinations regardless of a time between when the initial presence becomes absent and any subsequent presence of the conductive object is detected.

2. The method of claim 1, wherein distinguishing further comprises determining that the particular gesture is a tap gesture if the initial presence of the conductive object is absent at the expiration of the first timer, and the subsequent presence is absent after the expiration of the first timer.

3. The method of claim 1, wherein distinguishing further comprises determining that the particular gesture is a double tap gesture if the initial presence of the conductive object is absent at the expiration of the first timer, and the subsequent presence is detected after the expiration of the first timer, but is absent at the expiration of the second timer.

4. The method of claim 1, wherein distinguishing further comprises determining that the particular gesture is a drag gesture if the initial presence of the conductive object is absent at the expiration of the first timer, and the subsequent presence is detected after the expiration of the first timer and remains detected at the expiration of the second timer.

5. The method of claim 1, wherein distinguishing further comprises determining that the particular gesture is a motion gesture if the initial presence of the conductive object remains detected at the expiration of the first timer.

6. A method, comprising:
    starting a time interval when a presence of a conductive object is detected on a sensing device at a first instance; and
    at an end of the time interval, distinguishing a particular gesture from among at least three gestures, performed by the conductive object on the sensing device, wherein distinguishing the particular gesture comprises:
        determining a number of times an absence of the conductive object is detected on the sensing device after the first instance and before the end of the time interval; and
        determining a number of times a presence of the conductive object is detected on the sensing device after the first instance and before the end of the time interval, wherein said distinguishing the particular gesture comprises distinguishing the particular gesture using the results of said determinations regardless of a time between when the first instance becomes absent and any subsequent presence of the conductive object is detected.

7. The method of claim 6, wherein distinguishing further comprises distinguishing that the particular gesture is a tap gesture when the number of times the absence of the conductive object is detected on the sensing device is equal to one, and the number of times the presence of the conductive object is detected on the sensing device is equal to one.

8. The method of claim 6, wherein distinguishing further comprises distinguishing that the particular gesture is a double tap gesture when the number of times the absence of the conductive object is detected on the sensing device is equal to two and the number of times the presence of the conductive object is detected on the sensing device is equal to two.

9. The method of claim 6, wherein distinguishing further comprises distinguishing that the particular gesture is a drag gesture when the number of times the absence of the conductive object is detected on the sensing device is equal to one, and the number of times the presence of the conductive object is detected on the sensing device is equal to two.

10. The method of claim 6, wherein distinguishing further comprises distinguishing that the particular gesture is a motion gesture when the number of times the absence of the conductive object is detected on the sensing device is equal to zero and the number of times the presence of the conductive object is detected on the sensing device is equal to one.

11. The method of claim 6, wherein the time interval comprises a first time period and a second time period, and wherein distinguishing the particular gesture further comprises:
    determining a number of times the absence of the conductive object is detected on the sensing device during each of the first and second time periods after the first instance; and
    determining a number of times the presence of the conductive object is detected on the sensing device during each of the first and second time periods, wherein the number of times the presence of the conductive object is detected includes the first instance.

12. The method of claim 11, wherein distinguishing further comprises distinguishing that the particular gesture is a tap gesture when the number of times the absence of the conductive object is detected on the sensing device is equal to one during the first time period, the number of times the presence of the conductive object is detected on the sensing device is equal to one during the first time period, the number of times the absence of the conductive object is detected on from the sensing device is equal to zero during the second time period, and the number of times the presence of the conductive object is detected on the sensing device is equal to zero during the second time period.

13. The method of claim 11, wherein distinguishing further comprises distinguishing that the particular gesture is a double tap gesture when the number of times the absence of the conductive object is detected on the sensing device is equal to one during the first time period, the number of times the presence of the conductive object is detected on the sensing device is equal to one during the first time period, the number of times the absence of the conductive object is detected on the sensing device is equal to one during the second time period, and the number of times the presence of the conductive object is detected on the sensing device is equal to one during the second time period.

14. The method of claim 11, wherein distinguishing further comprises distinguishing that the particular gesture is a drag gesture when the number of times the absence of the conductive object is detected on the sensing device is equal to one during the first time period, the number of times the presence of the conductive object is detected on the sensing device is equal to one during the first time period, the number of times the absence of the conductive object is detected on the sensing device is equal to zero during the second time period, and the number of times the presence of the conductive object is detected on the sensing device is equal to one during the second time period.

15. The method of claim 11, wherein distinguishing further comprises distinguishing that the particular gesture is a motion gesture when the number of times the absence of the conductive object is detected on the sensing device is equal to zero during the first time period, the number of times the presence of the conductive object is detected on the sensing device is equal to one during the first time period, the number of times the absence of the conductive object is detected on the sensing device is equal to zero during the second time period, and the number of times the presence of the conductive object is detected on the sensing device is equal to one during the second time period.

16. The method of claim 11, wherein distinguishing further comprises determining that the particular gesture is a tap gesture if the presence of the conductive object is absent before an end of a first time interval of the fewer than three time intervals, and a subsequent presence is absent by an end of a second time interval of the fewer than three time intervals.

17. The method of claim 11, wherein distinguishing further comprises determining that the particular gesture is a double tap gesture if the presence of the conductive object is absent before an end of a first time interval of the fewer than three time intervals, and a subsequent presence is detected during a second time interval of the fewer than three time intervals, but is absent by an end of the second time interval.

18. The method of claim 11, wherein distinguishing further comprises determining that the particular gesture is a drag gesture if the presence of the conductive object is absent before an end of a first time interval of the fewer than three time intervals, and a subsequent presence is detected during a second time interval of the fewer than three time intervals and remains detected by an end of the second time interval.

19. The method of claim 6, wherein the time interval comprises a first time period and a second time period, and wherein distinguishing comprises determining that the particular gesture is a motion gesture if the presence of the conductive object remains detected at an end of the first time interval.

20. An apparatus, comprising:
a sensing device to detect an initial presence of a conductive object; and
a processing device coupled to the sensing device, the processing device to distinguish a particular gesture, from among at least three gestures, performed by the conductive object on the sensing device, wherein the processing device is configured to distinguish the particular gesture by:

in response to said detecting the initial presence, starting a first timer and a second timer;
at an expiration of the first timer, determining whether the initial presence of the conductive object is still detected or absent;
determining whether a subsequent presence of the conductive object is detected on the sensing device after the expiration of the first timer; and
at an expiration of the second timer, determining whether the subsequent presence of the conductive object is still detected or absent, wherein the processing device is configured to distinguishing the particular gesture using the results of said determinations regardless of a time between when the initial presence becomes absent and any subsequent presence of the conductive object is detected.

21. The apparatus of claim 20, wherein the processing device is configured to determine that the particular gesture is a tap gesture when the initial presence of the conductive object is absent at an expiration of the first timer, and the subsequent presence is absent after the expiration of the first timer.

22. The apparatus of claim 20, wherein the processing device is configured to determine that the particular gesture is a double tap gesture when the initial presence of the conductive object is absent at the expiration of the first timer, and the subsequent presence is detected after the expiration of the first timer, but is absent at the expiration of the second timer.

23. The apparatus of claim 20, wherein the processing device is configured to determine that the particular gesture is a drag gesture when the initial presence of the conductive object is absent at the expiration of the first timer, and the subsequent presence is detected after the expiration of the first timer- and remains detected at the expiration of the second timer.

24. The apparatus of claim 20, wherein the processing device is configured to determine that the particular gesture is a motion gesture when the initial presence of the conductive object remains detected at the expiration of the first timer.

25. The apparatus of claim 20, wherein the processing device comprises one or more capacitance sensors coupled to the sensing device, the one or more capacitance sensors to measure a capacitance on the sensing device.

26. An apparatus, comprising:
a sensing device to detect an initial presence of a conductive object; and
a processing device coupled to the sensing device, the processing device to distinguish a particular gesture from among at least three gestures, performed by the conductive object on the sensing device, wherein the processing device is configured to distinguish the particular gesture by:
in response to said detecting the initial presence, starting a single timer;
at a first timeout of the single timer, determining whether the initial presence of the conductive object is still detected or absent;
determining whether a subsequent presence of the conductive object is detected on the sensing device after the first timeout of the single timer; and
at a second timeout of the single timer, determining whether the subsequent presence of the conductive object is still detected or absent, wherein the processing device is configured to distinguishing the particular gesture using the results of said determinations regardless of a time between when the initial presence becomes absent and any subsequent presence of the conductive object is detected.

27. The apparatus of claim 26, wherein the processing device is configured to determine that the particular gesture is a tap gesture when the initial presence of the conductive object is absent at the first time out, and the subsequent presence is absent after the first timeout.

28. The apparatus of claim 26, wherein the processing device is configured to determine that the particular gesture is a double tap gesture if the initial presence of the conductive object is absent at the first timeout, and the subsequent presence is detected after the first timeout, but is absent at the second timeout.

29. The apparatus of claim 26, wherein the processing device is configured to determine that the particular gesture is a drag gesture if the initial presence of the conductive object is absent at the first timeout, and the subsequent presence is detected after the first timeout and remains detected at the second timeout.

30. The apparatus of claim 26, wherein the processing device is configured to determine that the particular gesture is a motion gesture if the initial presence of the conductive object remains detected at the first timeout.

31. A method, comprising:
detecting an initial presence of a conductive object on a sensing device, wherein said detecting the presence of the conductive object comprises determining that the presence of the conductive object is a legitimate presence;
distinguishing a particular gesture from among three gestures, performed by the conductive object on the sensing device, using first and second timeout periods, wherein the three gestures are a tap gesture, a double tap gesture, and a drag gesture;
detecting whether the presence of the conductive object is still detected or absent on the sensing device during the first and second timeout periods;
in response to said detecting the initial presence, starting the first timeout period; and
starting the second timeout period at an end of the first timeout period or at the start of the first time out period, wherein an end of the second timeout period is later in time than an end of the first timeout period, wherein distinguishing comprises:
determining that the particular gesture is the tap gesture if the initial presence of the conductive object is absent before the end of the first timeout period, and a subsequent presence is absent by the end of the second timeout period;
determining that the particular gesture is the double tap gesture if the initial presence of the conductive object is absent before the end of the first timeout period, and a subsequent presence is detected after the end of the first timeout period, but is absent by the end of the second timeout period; and
determining that the particular gesture is the drag gesture if the initial presence of the conductive object is absent before the end of the first timeout period, and a subsequent presence is detected after the end of the first timeout period and remains detected by the end of the second timeout period.

32. The method of claim 31, wherein distinguishing the particular gesture further comprises distinguishing the particular gesture regardless of a time between when an absence of the conductive object is detected on the sensing device after the first presence is detected and when the subsequent presence is detected.

33. The method of claim 31, further comprising:
determining if the initial presence of the conductive object remains detected on the sensing device after the first timeout period; and
if the initial presence of the conductive object remains detected on the sensing device after the first timeout period, determining that no gesture is detected; and
when no gesture is detected, determining movement of the conductive object on the sensing device.

34. A method, comprising:
detecting an initial presence of a conductive object on a sensing device; and
distinguishing a particular gesture from among at least three gestures, performed by the conductive object on the sensing device, wherein said distinguishing comprises:
in response to said detecting the initial presence, starting a single timer;
at a first timeout of the single timer, determining whether the initial presence of the conductive object is still detected or absent;
determining whether a subsequent presence of the conductive object is detected on the sensing device after the first timeout of the single timer; and
at a second timeout of the single timer, determining whether the subsequent presence of the conductive object is still detected or absent, wherein said distinguishing the particular gesture comprises distinguishing the particular gesture using the results of said determinations regardless of a time between when the initial presence becomes absent and any subsequent presence of the conductive object is detected.

35. The method of claim 34, wherein distinguishing further comprises determining that the particular gesture is a tap gesture if the initial presence of the conductive object is absent at the first timeout, and the subsequent presence is absent after the first timeout.

36. The method of claim 34, wherein distinguishing further comprises determining that the particular gesture is a double tap gesture if the initial presence of the conductive object is absent at the first timeout, and the subsequent presence is detected after the first timeout, but is absent at the second timeout.

37. The method of claim 34, wherein distinguishing further comprises determining that the particular gesture is a drag gesture if the initial presence of the conductive object is absent at the first timeout, and the subsequent presence is detected after the first timeout and remains detected at the second timeout.

38. The method of claim 34, wherein distinguishing further comprises determining that the particular gesture is a motion gesture if the initial presence of the conductive object remains detected at the first timeout.

* * * * *